(12) United States Patent
Dimnaku et al.

(10) Patent No.: US 10,817,348 B2
(45) Date of Patent: *Oct. 27, 2020

(54) METHODS AND SYSTEMS FOR MANAGING SERVICE LEVEL OBJECTIVES IN A NETWORKED STORAGE ENVIRONMENT

(71) Applicant: NETAPP, INC., Sunnyvale, CA (US)

(72) Inventors: Alma Dimnaku, Wellesley, MA (US); Jeffrey Scott MacFarland, Wake Forest, NC (US)

(73) Assignee: NETAPP, INC., Sunnyvale, CA (US)

( * ) Notice: Subject to any disclaimer, the term of this patent is extended or adjusted under 35 U.S.C. 154(b) by 66 days.

This patent is subject to a terminal disclaimer.

(21) Appl. No.: 16/275,649

(22) Filed: Feb. 14, 2019

(65) Prior Publication Data

US 2019/0179679 A1 Jun. 13, 2019

Related U.S. Application Data

(63) Continuation-in-part of application No. 15/090,878, filed on Apr. 5, 2016, now Pat. No. 10,210,023.

(51) Int. Cl.
*G06F 9/50* (2006.01)
*G06F 9/48* (2006.01)
(Continued)

(52) U.S. Cl.
CPC ............ *G06F 9/5083* (2013.01); *G06F 9/455* (2013.01); *G06F 9/45533* (2013.01);
(Continued)

(58) Field of Classification Search
CPC .. G06F 9/455; G06F 9/45533; G06F 9/45558; G06F 2009/4557;
(Continued)

(56) References Cited

U.S. PATENT DOCUMENTS 6,192,470 B1 2/2001 Kelley et al.
6,263,382 B1 7/2001 Bartlett et al.
(Continued)

OTHER PUBLICATIONS

Final Office Action dated Dec. 10, 2018 for U.S. Appl. No. 15/098,007, filed Apr. 24, 2018, 11 pages.
(Continued)

*Primary Examiner* — Charles M Swift
(74) *Attorney, Agent, or Firm* — Klein, O'Neill & Singh, LLP

(57) ABSTRACT

Methods and systems for a networked storage system are provided. One method includes determining by a processor, a demand pattern for a first workload that is assigned a service level objective (SLO) for using a resource of a networked storage system. The SLO is defined by an allotted performance parameter, and the demand pattern identifies a first duration when a SLO allotment for the first workload is underutilized, and a second duration when the SLO allotment is being utilized. The SLO allotment is dynamically adjusted for the first duration by modifying a parameter associated with the performance parameter, while maintaining the SLO allotment for the second duration. This makes additional performance capacity of the resource available for re-allocation. The additional available performance capacity is dynamically allocated for an identified second workload that needs an increase in SLO allotment for a certain duration and/or for provisioning a new workload.

20 Claims, 16 Drawing Sheets

(51) Int. Cl.
*G06F 9/455* (2018.01)
*H04L 12/24* (2006.01)
*H04L 29/08* (2006.01)

(52) U.S. Cl.
CPC ............ *G06F 9/45558* (2013.01); *G06F 9/48* (2013.01); *G06F 9/485* (2013.01); *G06F 9/4806* (2013.01); *G06F 9/4843* (2013.01); *G06F 9/4856* (2013.01); *G06F 9/4881* (2013.01); *G06F 9/50* (2013.01); *G06F 9/5005* (2013.01); *G06F 9/505* (2013.01); *G06F 9/5011* (2013.01); *G06F 9/5016* (2013.01); *G06F 9/5022* (2013.01); *G06F 9/5027* (2013.01); *G06F 9/5044* (2013.01); *G06F 9/5055* (2013.01); *H04L 41/0896* (2013.01); *H04L 41/50* (2013.01); *H04L 41/5003* (2013.01); *H04L 41/5009* (2013.01); *H04L 41/5012* (2013.01); *H04L 41/5025* (2013.01); *H04L 67/1097* (2013.01); *G06F 2009/4557* (2013.01); *G06F 2009/45583* (2013.01); *H04L 41/5096* (2013.01)

(58) Field of Classification Search
CPC ............ G06F 2009/45583; G06F 9/48; G06F 9/4806; G06F 9/4843; G06F 9/485; G06F 9/4856; G06F 9/4881; G06F 9/50; G06F 9/5005; G06F 9/5011; G06F 9/5016; G06F 9/5022; G06F 9/5027; G06F 9/5044; G06F 9/505; G06F 9/5055; G06F 9/5083; H04L 41/50; H04L 41/5003; H04L 41/5009; H04L 41/5012
See application file for complete search history.

(56) References Cited

U.S. PATENT DOCUMENTS

| | | | |
|---|---|---|---|
| 7,499,453 B2 * | 3/2009 | Carlson | H04L 41/5003 370/395.2 |
| 7,613,947 B1 | 11/2009 | Coatney et al. | |
| 7,664,798 B2 | 2/2010 | Wood et al. | |
| 7,707,015 B2 | 4/2010 | Lubrecht et al. | |
| 8,010,337 B2 | 8/2011 | Narayanan et al. | |
| 8,244,868 B2 | 8/2012 | La et al. | |
| 8,260,622 B2 | 9/2012 | Chron et al. | |
| 8,274,909 B2 | 9/2012 | Harvell et al. | |
| 8,412,672 B1 | 4/2013 | Radhakrishnan et al. | |
| 8,531,954 B2 | 9/2013 | McNaughton et al. | |
| 8,738,972 B1 | 5/2014 | Bakman et al. | |
| 8,874,954 B1 | 10/2014 | Gupte et al. | |
| 8,914,497 B1 | 12/2014 | Xiao et al. | |
| 8,996,666 B2 | 3/2015 | Vasseur et al. | |
| 9,009,296 B1 | 4/2015 | Siganporia et al. | |
| 9,063,939 B2 | 6/2015 | Dalton | |
| 9,128,965 B1 | 9/2015 | Yanacek et al. | |
| 9,444,711 B1 | 9/2016 | Siganporia et al. | |
| 9,645,901 B2 | 5/2017 | Nagaraj et al. | |
| 9,830,238 B2 | 11/2017 | Mu et al. | |
| 2002/0049845 A1 | 4/2002 | Sreenivasan et al. | |
| 2002/0152305 A1 | 10/2002 | Jackson et al. | |
| 2006/0074970 A1 | 4/2006 | Narayanan et al. | |
| 2006/0161883 A1 | 7/2006 | Lubrecht et al. | |
| 2006/0168272 A1 | 7/2006 | Rustad et al. | |
| 2007/0283016 A1 | 12/2007 | Pendarakis et al. | |
| 2008/0059972 A1 | 3/2008 | Ding et al. | |
| 2010/0075751 A1 | 3/2010 | Garvey et al. | |
| 2010/0232288 A1 | 9/2010 | Coatney et al. | |
| 2010/0262710 A1 | 10/2010 | Khatib et al. | |
| 2010/0313203 A1 | 12/2010 | Dawson et al. | |
| 2011/0197027 A1 | 8/2011 | Balasubramanian et al. | |
| 2011/0225362 A1 | 9/2011 | Leggette | |
| 2012/0011517 A1 | 1/2012 | Smith et al. | |
| 2012/0084270 A1 | 4/2012 | Jayaraman et al. | |
| 2012/0137002 A1 | 5/2012 | Ferris et al. | |
| 2013/0124714 A1 | 5/2013 | Bednar | |
| 2013/0139170 A1 * | 5/2013 | Prabhakar | G06F 9/4893 718/104 |
| 2013/0159548 A1 | 6/2013 | Vasseur et al. | |
| 2013/0166724 A1 * | 6/2013 | Bairavasundaram | G06F 9/5077 709/224 |
| 2013/0173804 A1 | 7/2013 | Murthy et al. | |
| 2013/0204960 A1 | 8/2013 | Ashok et al. | |
| 2013/0227111 A1 | 8/2013 | Wright et al. | |
| 2013/0304903 A1 | 11/2013 | Mick et al. | |
| 2014/0047040 A1 | 2/2014 | Patiejunas et al. | |
| 2014/0068053 A1 | 3/2014 | Ravi et al. | |
| 2014/0095696 A1 | 4/2014 | Sala et al. | |
| 2014/0165060 A1 | 6/2014 | Muller et al. | |
| 2014/0372607 A1 | 12/2014 | Gladwin et al. | |
| 2015/0006733 A1 | 1/2015 | Khan et al. | |
| 2015/0095892 A1 | 4/2015 | Baggott et al. | |
| 2015/0235308 A1 | 8/2015 | Mick et al. | |
| 2015/0295827 A1 | 10/2015 | Zhu et al. | |
| 2016/0065492 A1 | 3/2016 | Hu et al. | |
| 2016/0112275 A1 | 4/2016 | Park et al. | |
| 2016/0150030 A1 | 5/2016 | Apte et al. | |
| 2016/0173571 A1 | 6/2016 | Bragstad et al. | |
| 2017/0201580 A1 | 7/2017 | Dimnaku et al. | |

OTHER PUBLICATIONS

Final Office Action dated Jun. 14, 2017 for U.S. Appl. No. 14/805,770, filed Jul. 22, 2015, 19 pages.
Final Office Action dated Jun. 8, 2018 for U.S. Appl. No. 14/994,009, filed Jan. 12, 2016, 17 pages.
Final Office Action dated Oct. 2, 2018 for U.S. Appl. No. 14/805,770, filed Jul. 22, 2015, 49 pages.
Final Office Action dated Oct. 6, 2017 for U.S. Appl. No. 14/805,804, filed Jul. 22 2015, 15 pages.
Non Final Office Action dated Dec. 1, 2017 for U.S. Appl. No. 15/071,917, filed Mar. 16, 2016, 20 pages.
Non Final Office Action dated Jan. 23, 2017 for U.S. Appl. No. 14/805,770, filed Jul. 22, 2015, 25 pages.
Non-Final Office Action dated Apr. 12, 2018 for U.S. Appl. No. 15/098,007, filed Apr. 24, 2018.
Non-Final Office Action dated Aug. 30, 2018 for U.S. Appl. No. 15/896,363, filed Feb. 14, 2018, 8 pages.
Non-Final Office Action dated Dec. 15, 2017 for U.S. Appl. No. 15/141,357, filed Apr. 28, 2016, 30 pages.
Non-Final Office Action dated Dec. 20, 2017 for U.S. Appl. No. 14/805,770, filed Jul. 22, 2015, 25 pages.
Non-Final Office Action dated May 5, 2017 for U.S. Appl. No. 14/805,804, filed Jul. 22 2015, 26 pages.
Non-Final Office Action dated Nov. 21, 2017 for U.S. Appl. No. 14/994,009, filed Jan. 12, 2016, 31 pages.
Non-FinalOffice Action dated Nov. 8, 2016 for U.S. Appl. No. 14/805,829, filed Jul. 22, 2015, 12 pages.
Notice of Allowance dated Aug. 31, 2016 for U.S. Appl. No. 14/805,851, filed Jul. 22, 2015, 8 pages.
Notice of Allowance dated Jan. 4, 2017 for U.S. Appl. No. 14/805,829, filed Jul. 22, 2015, 6 pages.
Notice of Allowance dated Jan. 19, 2018 for U.S. Appl. No. 14/805,804, filed Jul. 22 2015, 9 pages.
Notice of Allowance dated May 25, 2018 for U.S. Appl. No. 15/071,917, filed Mar. 16, 2016, 16 pages.
Notice of Allowance dated May 29, 2018 for U.S. Appl. No. 15/141,357, filed Apr. 28, 2016, 14 pages.
Notice of Allowance on co-pending U.S. Appl. No. 14/994,009 dated Nov. 16, 2018
Final Office Action on co-pending U.S. Appl. No. 15/896,363 dated May 2, 2019
Non-Final Office Action on co-pending U.S. Appl. No. 15/098,007 dated May 7, 2019.
Notice of Allowance on co-pending U.S. Appl. No. 14/805,770 dated Jun. 5, 2019.

(56) References Cited

OTHER PUBLICATIONS

Notice of Allowance on co-pending U.S. Appl. No. 15/098,007 dated Aug. 30, 2019.

* cited by examiner

METHODS AND SYSTEMS FOR MANAGING SERVICE LEVEL OBJECTIVES IN A NETWORKED STORAGE ENVIRONMENT

CROSS-REFERENCE TO RELATED APPLICATIONS

This patent application is a continuation-in-part (CIP) of pending U.S. patent application Ser. No. 15/090,878, filed on Apr. 5, 2016, entitled, "Methods and Systems for Managing Service Level Objectives in a Networked Storage Environment", the disclosure of which is incorporated herein by reference in its entirety.

TECHNICAL FIELD

The present disclosure relates to managing service level objectives in a networked storage environment.

Background

Various forms of storage systems are used today. These forms include direct attached storage (DAS) network attached storage (NAS) systems, storage area networks (SANs), and others. Network storage systems are commonly used for a variety of purposes, such as providing multiple clients with access to shared data, backing up data and others.

A storage system typically includes at least a computing system executing a storage operating system for storing and retrieving data on behalf of one or more client computing systems (may just be referred to as "client" or "clients"). The storage operating system stores and manages shared data containers in a set of mass storage devices.

Quality of Service (QOS) is a metric used in a networked storage environment to provide certain throughput for processing input/output (I/O) requests for reading or writing data, a response time goal within, which I/O requests are processed and a number of I/O requests processed within a given time (for example, in a second (IOPS). Throughput means amount of data transferred within a given time, for example, in megabytes per second (Mb/s).

Clients today may be provided with a guaranteed service level when it comes to storage performance. The service level is typically defined by a service level object that is associated with a particular storage level and defines a service level objective (SLO). SLOB are typically associated with a workload (for example, a volume, LUN, file and others). The workload is assigned to one or more resources for storing data and retrieving data for the workload. The resource utilization and workload performance vary in different periods. Conventional systems do not provide efficient tools for sharing SLO allotments based on SLO tracking. Continuous efforts are being made to provide better manageability solutions for networked storage environments that are used by various clients.

BRIEF DESCRIPTION OF THE DRAWINGS

The various features of the present disclosure will now be described with reference to the drawings of the various aspects. In the drawings, the same components may have the same reference numerals. The illustrated aspects are intended to illustrate, but not to limit the present disclosure. The drawings include the following Figures.

DETAILED DESCRIPTION

Figure 1:
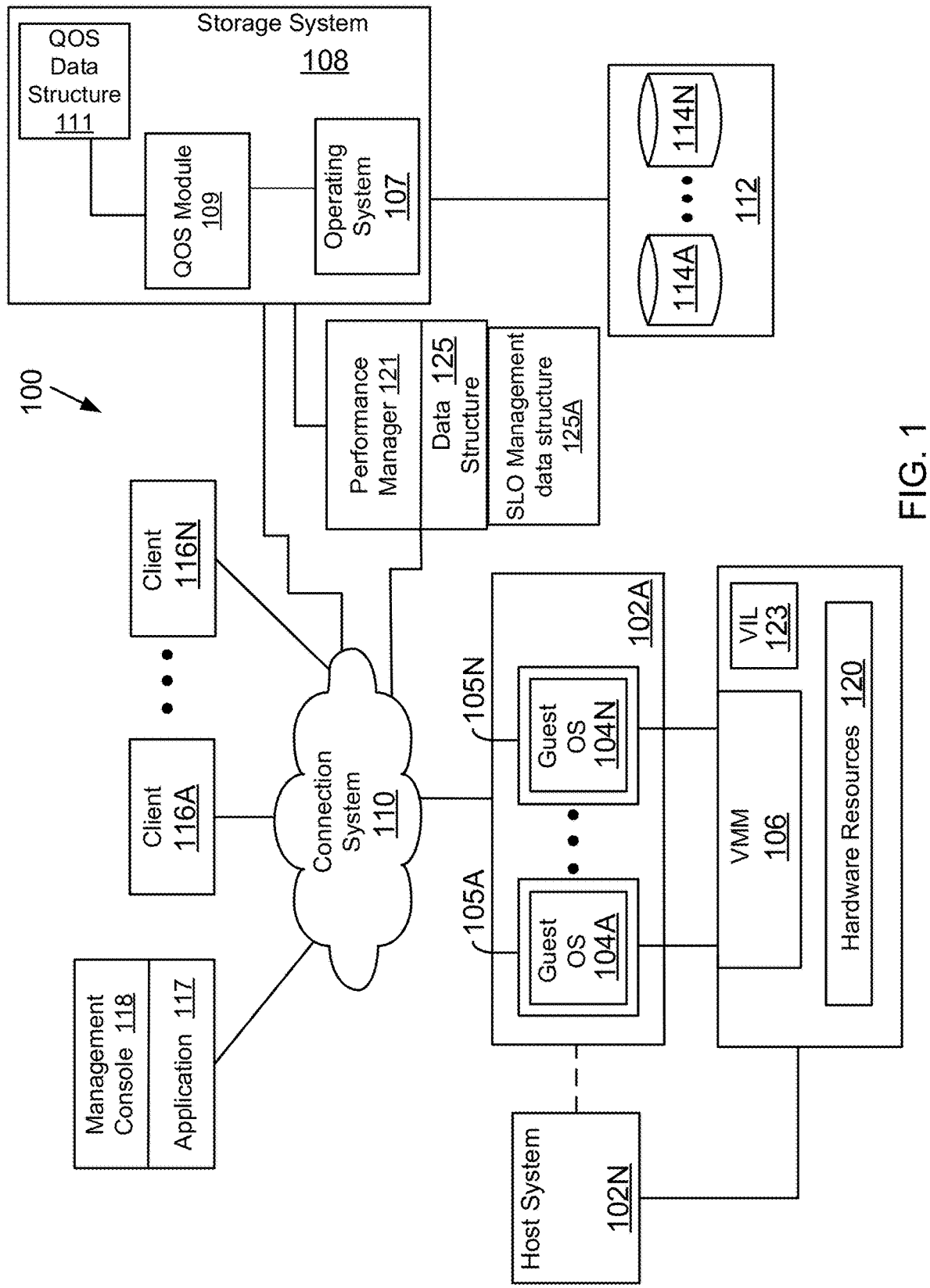
FIG. 1 shows an example of an operating environment for the various aspects disclosed herein.

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a hardware processor, a hardware based processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

In one aspect, a performance manager module is provided that interfaces with a storage operating system to collect quality of service (QOS) data (or performance data) for various resources. QOS provides a certain throughput (i.e. amount of data that is transferred within a given time interval (for example, megabytes per seconds (MBS)), latency and/or a number of input/output operations that can be processed within a time interval, for example, in a second (referred to as IOPS). Latency means a delay in completing the processing of an I/O request and may be measured using different metrics for example, a response time in processing I/O requests.

In one aspect, methods and systems for managing resources in a networked storage environment is provided. The resources may be managed based on remaining (or useful) performance capacity at any given time that is available for a resource relative to a peak/optimal performance capacity without violating any performance expectations. The available performance capacity may be referred to as "headroom" that is discussed in detail below. The resource may be any resource in the networked storage environment, including processing nodes and aggregates that are described below in detail. The type of performance capacity will vary based on the resource type, for example, the performance capacity of a CPU is the percentage of available CPU resources, the performance capacity of a switch is the ability to transfer data at a certain rate and the performance capacity of a storage device is the capacity to store data and return data. Peak performance capacity of a resource may be determined according to performance limits that may be set by policies (for example, QoS or service level objectives ("SLOs") as described below).

In one aspect, a management tool is provided that enables a user to associate different SLOs to different workloads (for example, volume, LUN and other logical objects). The workloads associated with the SLOs are not constant and change over time. Some workloads quiesce during a certain duration for one or more reasons (for example, time of the day, geographical location of the data centers and others). In one aspect, the management tool enables a storage administrator to automatically change SLO throughputs to accommodate shifts or changes in workloads, as described below in detail. Historical performance and headroom data is used to identify durations when a given SLO is not utilizing some or all of its allotment. This information with the historical performance data provides an understanding of the relationship between SLOs and workloads within a storage network. This enables users to setup automatic rebalancing of SLO allotments, as described below in detail.

Before describing the various aspects of the present disclosure, the following provides a description of the overall networked storage environment and the resources used in the operating environment for storing data.

System 100:

FIG. 1 shows an example of a system 100, where the various adaptive aspects disclosed herein may be implemented. System 100 includes a performance manager 121 that interfaces with a storage operating system 107 of a storage system 108 for receiving QOS data. The performance manager 121 may be a processor executable module that is executed by one or more processors out of a memory device.

The performance manager 121 obtains the QOS data and stores it at a data structure 125. The performance manager 121 also uses a SLO management data structure 125A for tracking SLO allotments and rebalancing SLO allotments as described below in detail. Details regarding the various operations performed by the performance manager 121 are provided below.

In one aspect, storage system 108 has access to a set of mass storage devices 114A-114N (may be referred to as storage devices 114 or simply as storage device 114) within at least one storage subsystem 112. The storage devices 114 may include writable storage device media such as magnetic disks, video tape, optical, DVD, magnetic tape, non-volatile memory devices for example, solid state drives (SSDs) including self-encrypting drives, flash memory devices and any other similar media adapted to store information. The storage devices 114 may be organized as one or more groups of Redundant Array of Independent (or Inexpensive) Disks (RAID). The aspects disclosed are not limited to any particular storage device type or storage device configuration.

In one aspect, the storage system 108 provides a set of logical storage volumes (may be interchangeably referred to as volume or storage volume) for providing physical storage space to clients 116A-116N (or virtual machines (VMs) 105A-105N). A storage volume is a logical storage object and typically includes a file system in a NAS environment or a logical unit number (LUN) in a SAN environment. The various aspects described herein are not limited to any specific format in which physical storage is presented as logical storage (volume, LUNs and others)

Each storage volume may be configured to store data files (or data containers or data objects), scripts, word processing documents, executable programs, and any other type of structured or unstructured data. From the perspective of one of the client systems, each storage volume can appear to be a single drive. However, each storage volume can represent storage space in at one storage device, an aggregate of some or all of the storage space in multiple storage devices, a RAID group, or any other suitable set of storage space.

A storage volume is identified by a unique identifier (Volume-ID) and is allocated certain storage space during a configuration process. When the storage volume is created, a QOS policy may be associated with the storage volume such that requests associated with the storage volume can be managed appropriately. The QOS policy may be a part of a QOS policy group (referred to as "Policy_Group") that is used to manage QOS for several different storage volumes as a single unit. The QOS policy information may be stored at a QOS data structure 111 maintained by a QOS module 109. QOS at the storage system level may be implemented by the QOS module 109. QOS module 109 maintains various QOS data types that are monitored and analyzed by the performance manager 121, as described below in detail.

The storage operating system 107 organizes physical storage space at storage devices 114 as one or more "aggregate", where each aggregate is a logical grouping of physical storage identified by a unique identifier and a location. The aggregate includes a certain amount of storage space that can be expanded. Within each aggregate, one or more storage volumes are created whose size can be varied. A qtree, sub-volume unit may also be created within the storage volumes. For QOS management, each aggregate and the storage devices within the aggregates are considered as resources that are used by storage volumes.

The storage system 108 may be used to store and manage information at storage devices 114 based on an I/O request. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FCP).

In a typical mode of operation, a client (or a VM) transmits one or more I/O request, such as a CFS or NFS read or write request, over a connection system 110 to the storage system 108. Storage operating system 107 receives the request, issues one or more I/O commands to storage devices 114 to read or write the data on behalf of the client system, and issues a CIFS or NFS response containing the requested data over the network 110 to the respective client system.

System 100 may also include a virtual machine environment where a physical resource is time-shared among a plurality of independently operating processor executable VMs. Each VM may function as a self-contained platform, running its own operating system (OS) and computer executable, application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host platform or host system) which may be referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host system.

In one aspect, system 100 may include a plurality of computing systems 102A-102N (may also be referred to individually as host platform/system 102 or simply as server 102) communicably coupled to the storage system 108 via the connection system 110 such as a local area network (LAN), wide area network (WAN), the Internet or any other interconnect type. As described herein, the term "communicably coupled" may refer to a direct connection, a network connection, a wireless connection or other connections to enable communication between devices.

Host system 102A includes a processor executable virtual machine environment having a plurality of VMs 105A-105N that may be presented to client computing devices/systems 116A-116N. VMs 105A-105N execute a plurality of guest OS 104A-104N (may also be referred to as guest OS 104) that share hardware resources 120. As described above, hardware resources 120 may include processors, memory, I/O devices, storage or any other hardware resource.

In one aspect, host system 102 interfaces with a virtual machine monitor (VMM) 106, for example, a processor executed Hyper-V layer provided by Microsoft Corporation of Redmond, Wash., a hypervisor layer provided by VMWare Inc., or any other type. VMM 106 presents and manages the plurality of guest OS 104A-104N executed by the host system 102. The VMM 106 may include or interface with a virtualization layer (VIL) 123 that provides one or more virtualized hardware resource to each OS 104A-104N.

In one aspect, VMM 106 is executed by host system 102A with VMs 105A-105N. In another aspect, VMM 106 may be executed by an independent stand-alone computing system, often referred to as a hypervisor server or VMM server and VMs 105A-105N are presented at one or more computing systems.

It is noteworthy that different vendors provide different virtualization environments, for example, VMware Corporation, Microsoft Corporation and others. The generic virtualization environment described above with respect to FIG. 1 may be customized to implement the aspects of the present disclosure. Furthermore, VMM 106 (or VIL 123) may execute other modules, for example, a storage driver, network interface and others, the details of which are not germane to the aspects described herein and hence have not been described in detail.

System 100 may also include a management console 118 that executes a processor executable management application 117 for managing and configuring various elements of system 100. Application 117 may be used to manage and configure VMs and clients as well as configure resources that are used by VMs/clients, according to one aspect. It is noteworthy that although a single management console 118 is shown in FIG. 1, system 100 may include other management consoles performing certain functions, for example, managing storage systems, managing network connections and other functions described below.

In one aspect, application 117 may be used to present storage space that is managed by storage system 108 to clients' 116A-116N (or VMs). The clients may be grouped into different service levels (also referred to as SLOs), where a client with a higher service level may be provided with more storage space than a client with a lower service level. A client at a higher level may also be provided with a certain QOS vis-à-vis a client at a lower level.

Figure 2A:
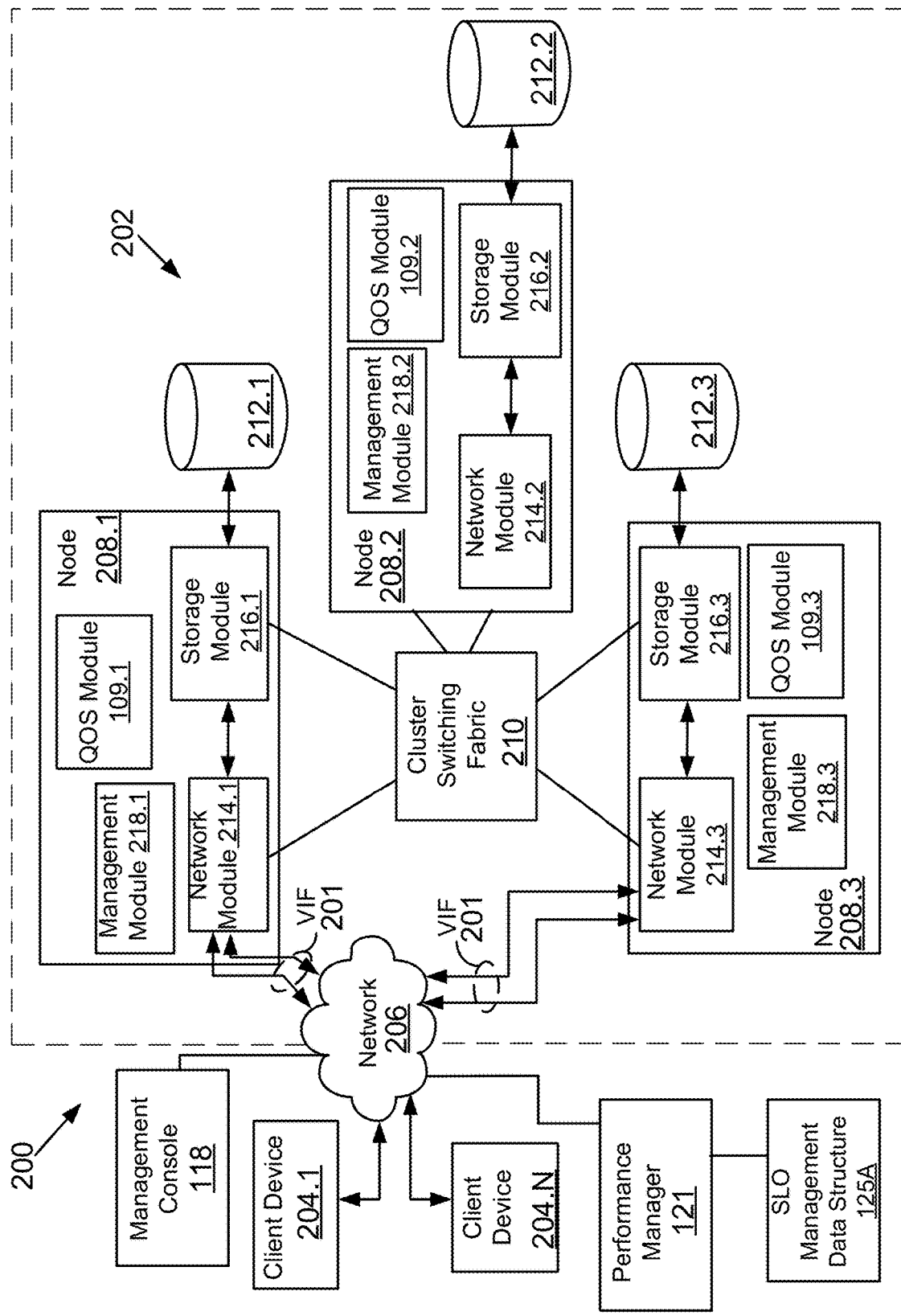
FIG. 2A shows an example of a clustered storage system, used according to one aspect of the present disclosure.

Although storage system 108 is shown as a stand-alone system, i.e. a non-cluster based system, in another aspect, storage system 108 may have a distributed architecture; for example, a cluster based system of FIG. 2A. Before describing the various aspects of the performance manager 121, the following provides a description of a cluster based storage system.

Clustered Storage System:

FIG. 2A shows a cluster based storage environment 200 having a plurality of nodes for managing storage devices, according to one aspect. Storage environment 200 may include a plurality of client systems 204.1-204.N (similar to clients 116A-116N, FIG. 1), a clustered storage system 202, performance manager 121, management console 118 and at least a network 206 communicably connecting the client systems 204.1-204.N and the clustered storage system 202.

The clustered storage system 202 includes a plurality of nodes 208.1-208.3, a cluster switching fabric 210, and a plurality of mass storage devices 212.1-212.3 (may be referred to as 212 and similar to storage device 114) that are used as resources for processing I/O requests.

Each of the plurality of nodes 208.1-208.3 is configured to include a network module (may be referred to as N-module), a storage module (may be referred to as D-module), and a management module (may be referred to as M-Module), each of which can be implemented as a processor executable module. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3.

The network modules 214.1-214.3 include functionality that enable the respective nodes 208.1-208.3 to connect to one or more of the client systems 204.1-204.N over the computer network 206, while the storage modules 216.1-216.3 connect to one or more of the storage devices 212.1-212.3. Accordingly, each of the plurality of nodes 208.1-208.3 in the clustered storage server arrangement provides the functionality of a storage server.

The management modules 218.1-218.3 provide management functions for the clustered storage system 202. The management modules 218.1-218.3 collect storage information regarding storage devices 212.

Each node may execute or interface with a QOS module, shown as 109.1-109.3 that is similar to the QOS module 109. The QOS module 109 may be executed for each node or a single QOS module may be used for the entire cluster. The aspects disclosed herein are not limited to the number of instances of QOS module 109 that may be used in a cluster.

A switched virtualization layer including a plurality of virtual interfaces (VIFs) 201 is provided to interface between the respective network modules 214.1-214.3 and the client systems 204.1-204.N, allowing storage 212.1-212.3 associated with the nodes 208.1-208.3 to be presented to the client systems 204.1-204.N as a single shared storage pool.

The clustered storage system 202 can be organized into any suitable number of virtual servers (also referred to as "vservers" or storage virtual machines (SVM)), in which each SVM represents a single storage system namespace with separate network access. Each SVM has a client domain and a security domain that are separate from the client and security domains of other SVMs. Moreover, each SVM is associated with one or more VIFs and can span one or more physical nodes, each of which can hold one or more VIFs and storage associated with one or more SVMs. Client systems can access the data on a SVM from any node of the clustered system, through the VIFs associated with that SVM. It is noteworthy that the aspects described herein are not limited to the use of SVMs.

Each of the nodes 208.1-208.3 is defined as a computing system to provide application services to one or more of the client systems 204.1-204.N. The nodes 208.1-208.3 are interconnected by the switching fabric 210, which, for example, may be embodied as a Gigabit Ethernet switch or any other type of switching/connecting device.

Although FIG. 2A depicts an equal number (i.e., 3) of the network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules.

Each client system 204.1-204.N may request the services of one of the respective nodes 208.1, 208.2, 208.3, and that node may return the results of the services requested by the client system by exchanging packets over the computer network 206, which may be wire-based, optical fiber, wireless, or any other suitable combination thereof.

Performance manager 121 interfaces with the various nodes and obtains QOS data for QOS data structure 125. Details regarding the various modules of performance manager are now described with respect to FIG. 2B.

Figure 2B:
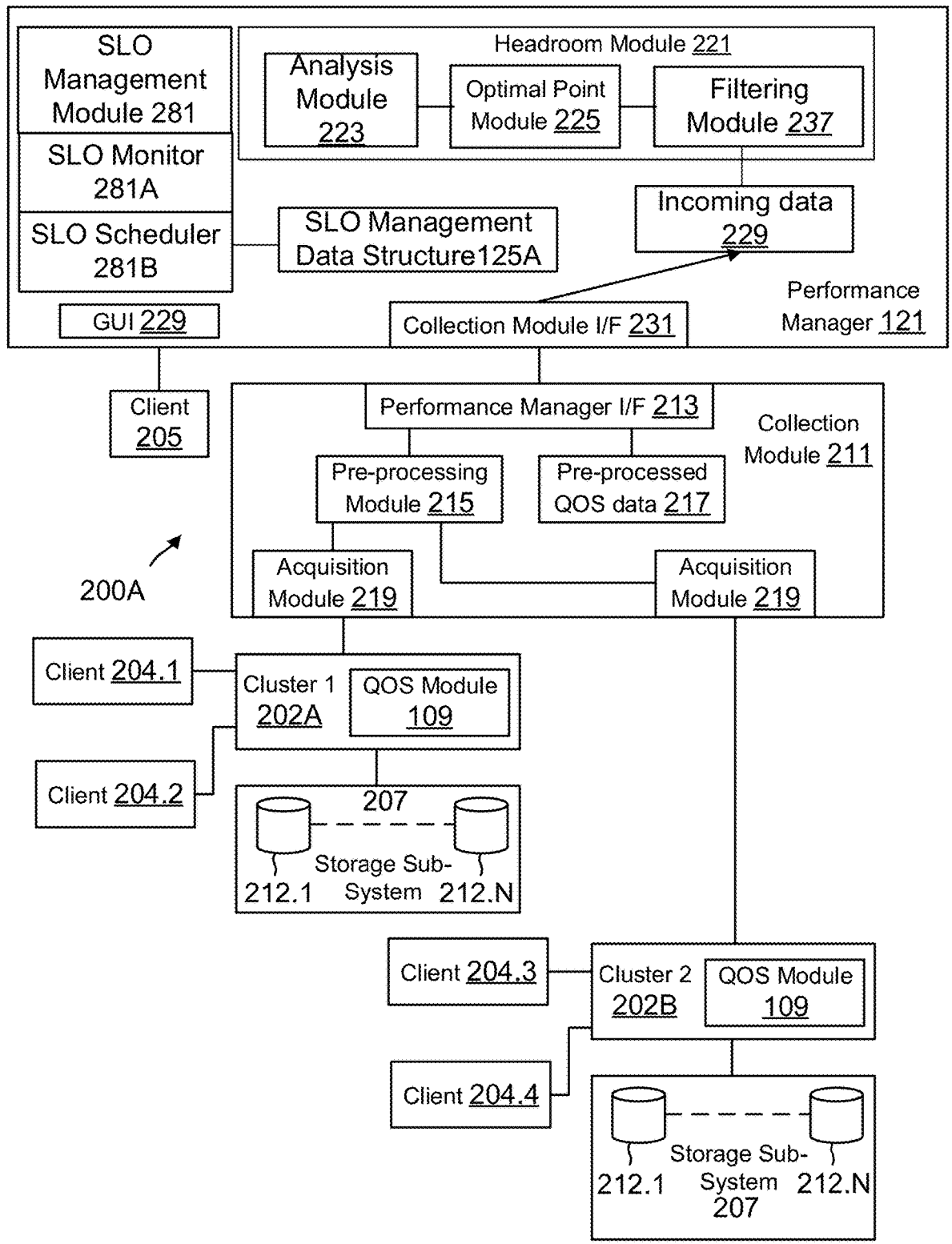
FIG. 2B shows an example of a performance manager, according to one aspect of the present disclosure.

Performance Manager 121:

FIG. 2B shows a block diagram of a system 200A with details regarding performance manager 121 and a collection module 211, according to one aspect. Performance manager 121 may include or interface with a SLO management module 281 that includes a SLO monitor 281A and a SLO scheduler 281B. The SLO monitor 281A tracks overall SLO allotments as described below in detail. The SLO scheduler 281B is used to dynamically rebalance SLO allotments, as described below in detail.

Performance manager 121 uses the concept of workloads for tracking resources and workloads in a networked storage environment. At a high level, workloads are defined based on incoming I/O requests and use resources within storage system 202 for processing I/O requests. A workload may include a plurality of streams, where each stream includes one or more requests. A stream may include requests from one or more clients. An example, of the workload model used by performance manager 121 is shown in FIG. 2F and described below in detail.

Performance manager 121 collects a certain amount of data (for example, data for 3 hours or 30 data samples) of workload activity. After collecting the QOS data, performance manager 121 determines the headroom for a resource. Performance manager 121 uses the headroom to represent available performance resource capacity at any given time. The available headroom information may be stored at a storage device as part of SLO management data structure 125A.

Performance 121 includes a headroom module 221 that includes a plurality of sub-modules including a filtering module 237, an optimal point module 225 and an analysis module 223. The filtering module 237 filters collected QOS data (shown as incoming data 229) and provides the filtered data to the optimal point module 225. The optimal point module 225 then determines an optimal point for a latency v utilization (LvU) curve shown in FIG. 6C. In one aspect, the optimal point module 225 determines the optimal point using a plurality of techniques.

The optimal point with the LvU curve is provided to the analysis module 223 that uses the curve and determines the headroom based on one or more operational points.

In one aspect, the headroom module 221 and its components may be implemented as a processor executable, application programming interface (API) which provides a set of routines, protocols, and tools for building a processor executable software application that can be executed by a computing device. When the headroom module 221 is implemented as one or more APIs, then it provides software components' in terms of its operations, inputs, outputs, and underlying types. The APIs may be implemented as plug-in APIs which integrate headroom computation and analysis with other management applications.

System 200A further shows two clusters 202A and 202B, both similar to cluster 202 described above. Each cluster includes the QOS module 109 for implementing QOS policies and appropriate counters for collecting information regarding various resources. Cluster 1 202A may be accessible to clients 204.1 and 204.2, while cluster 2 202B is accessible to clients 204.3/204.4. Both clusters have access to storage subsystems 207 and storage devices 212.1/212.N.

Clusters 202A and 202B communicate with collection module 211. The collection module 211 may be a standalone computing device or integrated with performance manager 121. The aspects described herein are not limited to any particular configuration of collection module 211 and performance manager 121.

Collection module 211 includes one or more acquisition modules 219 for collecting QOS data from the clusters. The data is pre-processed by the pre-processing module 215 and stored as pre-processed QOS data 217 at a storage device (not shown). Pre-processing module 215 formats the collected QOS data for the performance manager 121. Pre-processed QOS data 217 is provided to a collection module interface 231 of the performance manager 121 via the performance manager interface 213. QOS data received from collection module 211 is stored as QOS data structure 125 (shown as incoming data 229) and used by the filtering module 237, before the data is used for computing the optimal point.

In one aspect, the performance manager 121 includes a GUI 229. Client 205 may access the SLO management module 281 using the GUI module 229. The client may assign a SLO to one or more workloads. Once the workload is identified, the performance manager 121 stores the historical performance for the workload and the performance capacity of the resources that are used by the workload. In one aspect, the SLO monitor 281A generates a historical view that depicts the combined throughput (or IOPS) of all workloads that are associated with an SLO over a given time. The historical view presents the SLO throughput requirement along with the headroom for the resources of the networked storage environment.

The historical view provides durations when a given SLO allotment is not being utilized. Using the historical view, a schedule can be created by the SLO scheduler 281B that enforces SLO requirements during non-idle times and deactivates or modifies the SLO enforcement during idle times.

Once a SLO schedule is created, then the storage cluster tracks the non-idle and idle times for a given SLO. If the schedule does not match with actual idle times and non-idle times, then the user is notified.

In one aspect, the SLO management module 281 machine learns the highs and lows of workload demands. The SLO management module 281 provides guidance with regard to how long to schedule periodic tasks and workloads. The historical patterns are learned using state based models described below with respect to FIG. 6B.

Before describing the various processes involving performance manager 121 and its components, the following provides an overview of QOS in general, as used by the various aspects of the present disclosure.

Figure 2C:
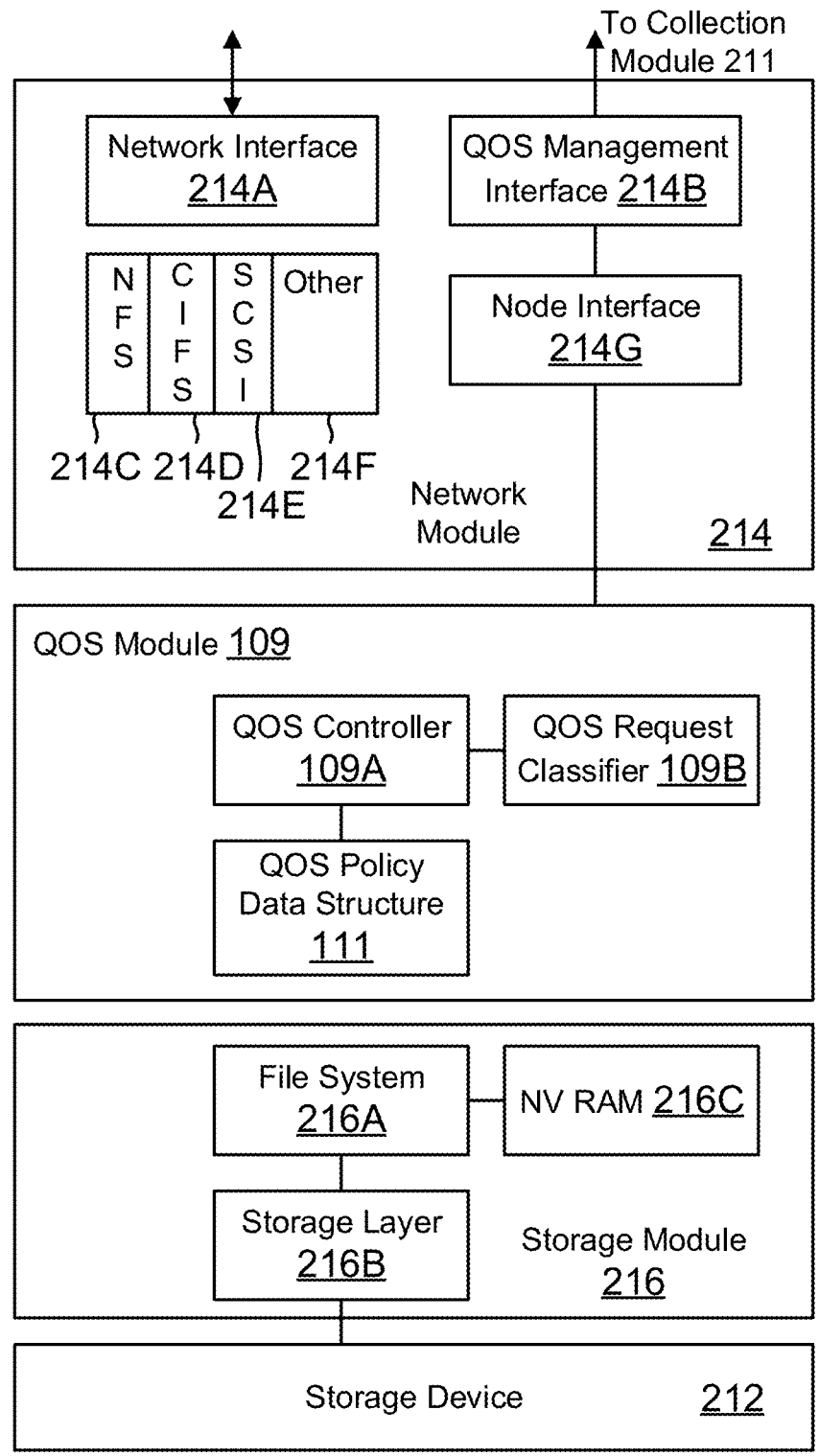
FIG. 2C shows an example of handling QOS requests by a storage system, according to one aspect of the present disclosure.

QOS Overview:

FIG. 2C shows a network module 214 of a cluster node includes a network interface 214A for receiving requests from clients. Network module 214 executes a NFS module 214C for handling NFS requests, a CIFS module 214D for handling CIFS requests, a SCSI module 214E for handling iSCSI requests and an others module 214F for handling "other" requests. A node interface 214G is used to communicate with QOS module 109, storage module 216 and/or another network module 214. QOS management interface 214B is used to provide QOS data from the cluster to collection module 211 for pre-processing data.

QOS module 109 includes a QOS controller 109A, a QOS request classifier 109B and QOS policy data structure (or Policy_Group) 111. The QOS policy data structure 111 stores policy level details for implementing QOS for clients and storage volumes. The policy determines what latency and throughput rate is permitted for a client/SLO as well as for specific storage volumes. The policy determines how I/O requests are processed for different volumes and clients.

The storage module 216 executes a file system 216A (a part of storage operating system 107 described below) and includes a storage layer 216B to interface with storage device 212.

NVRAM 216C of the storage module 216 may be used as a cache for responding to I/O requests. In one aspect, for executing a write request, the write data associated with the write request is first stored at a memory buffer of the storage module 216. The storage module 216 acknowledges that the write request is completed after it is stored at the memory buffer. The data is then moved from the memory buffer to the NVRAM 216C and then flushed to the storage device 212, referred to as consistency point (CP).

An I/O request arrives at network module 214 from a client or from an internal process directly to file system 216A. Internal process in this context may include a de-duplication module, a replication engine module or any other entity that needs to perform a read and/or write operation at the storage device 212. The request is sent to the QOS request classifier 109B to associate the request with a particular workload. The classifier 109B evaluates a request's attributes and looks for matches within QOS policy data structure 111. The request is assigned to a particular workload, when there is a match. If there is no match, then a default workload may be assigned.

Once the request is classified for a workload, then the request processing can be controlled. QOS controller 109A determines if a rate limit (i.e. a throughput rate) for the request has been reached. If yes, then the request is queued for later processing. If not, then the request is sent to file system 216A for further processing with a completion deadline. The completion deadline is tagged with a message for the request.

File system 216A determines how queued requests should be processed based on completion deadlines. The last stage of QOS control for processing the request occurs at the physical storage device level. This could be based on latency with respect to storage device 212 or overall node capacity/utilization as described below in detail.

Figure 2D:
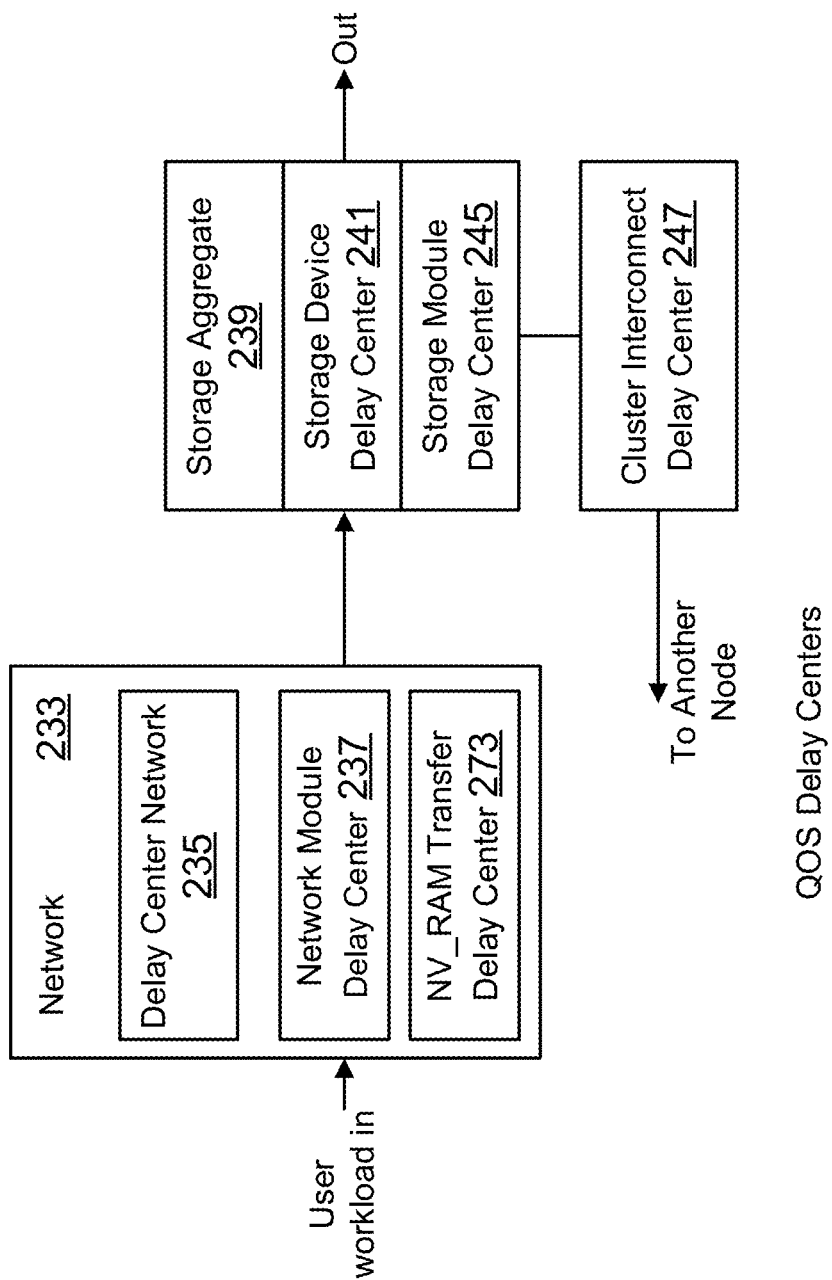
FIG. 2D shows an example of a resource layout used by the performance manager, according to one aspect of the present disclosure.

Performance Model:

FIG. 2D shows an example of a queuing structure used by the performance manager 121 for SLO management and determining headroom, according to one aspect. A user workload enters the queuing network from one end (i.e. at 233) and leaves at the other end.

Various resources are used to process I/O requests. As an example, there are may be two types of resources, a service center and a delay center resource. The service center is a resource category that can be represented by a queue with a wait time and a service time (for example, a processor that processes a request out of a queue). The delay center may be a logical representation for a control point where a request stalls waiting for a certain event to occur and hence the delay center represents the delay in request processing. The delay center may be represented by a queue that does not include service time and instead only represents wait time. The distinction between the two resource types is that for a service center, the QOS data includes a number of visits, wait time per visit and service time per visit for incident detection and analysis. For the delay center, only the number of visits and the wait time per visit at the delay center are used, as described below in detail.

Performance manager 121 uses different flow types for its analysis. A flow type is a logical view for modeling request processing from a particular viewpoint. The flow types include two categories, latency and utilization. A latency flow type is used for analyzing how long operations take at the service and delay centers. The latency flow type is used to identify a workload whose latency has increased beyond a certain level. A typical latency flow may involve writing data to a storage device based on a client request and there is latency involved in writing the data at the storage device. The utilization flow type is used to understand resource consumption of workloads and may be used to identify resource contention.

Referring now to FIG. 2D, delay center network 235 is a resource queue that is used to track wait time due to external networks. Storage operating system 107 often makes calls to external entities to wait on something before a request can proceed. Delay center 235 tracks this wait time using a counter (not shown).

Network module delay center 237 is another resource queue where I/O requests wait for protocol processing by a network module processor. This delay center 237 is used to track the utilization/capacity of the network module 216. Overutilization of this resource may cause latency, as described below in detail.

NV_RAM transfer delay center 273 is used to track how the non-volatile memory may be used by cluster nodes to store write data before, the data is written to storage devices 212, in one aspect, as described below in detail.

A storage aggregate (or aggregate) 239 is a resource that may include more than one storage device for reading and writing information. Aggregate 239 is tracked to determine if the aggregate is fragmented and/or over utilized, as described below in detail.

Storage device delay center 241 may be used to track the utilization of storage devices 212. In one aspect, storage device utilization is based on how busy a storage device may be in responding to I/O requests.

In one aspect, storage module delay center 245 is used for tracking node utilization. Delay center 245 is tracked to monitor the idle time for a CPU used by the storage module 216, the ratio of sequential and parallel operations executed by the CPU and a ratio of write duration and flushing duration for using NVRAM 216C or an NVRAM at the storage module (not shown).

Nodes within a cluster communicate with each other. These may cause delays in processing I/O requests. The cluster interconnect delay center 247 is used to track the wait time for transfers using the cluster interconnect system. As an example, a single queue may be used to track delays due to cluster interconnects.

There may also be delay centers due to certain internal processes of storage operating system 107 and various queues may be used to track those delays. For example, a queue may be used to track the wait for I/O requests that may be blocked for file system reasons. Another queue (Delay_Center_Susp_CP) may be used to represent the wait time for Consistency Point (CP) related to the file system 216A. During a CP, write requests are written in bulk at storage devices and this will typically cause other write requests to be blocked so that certain buffers are cleared.

Figure 2E:
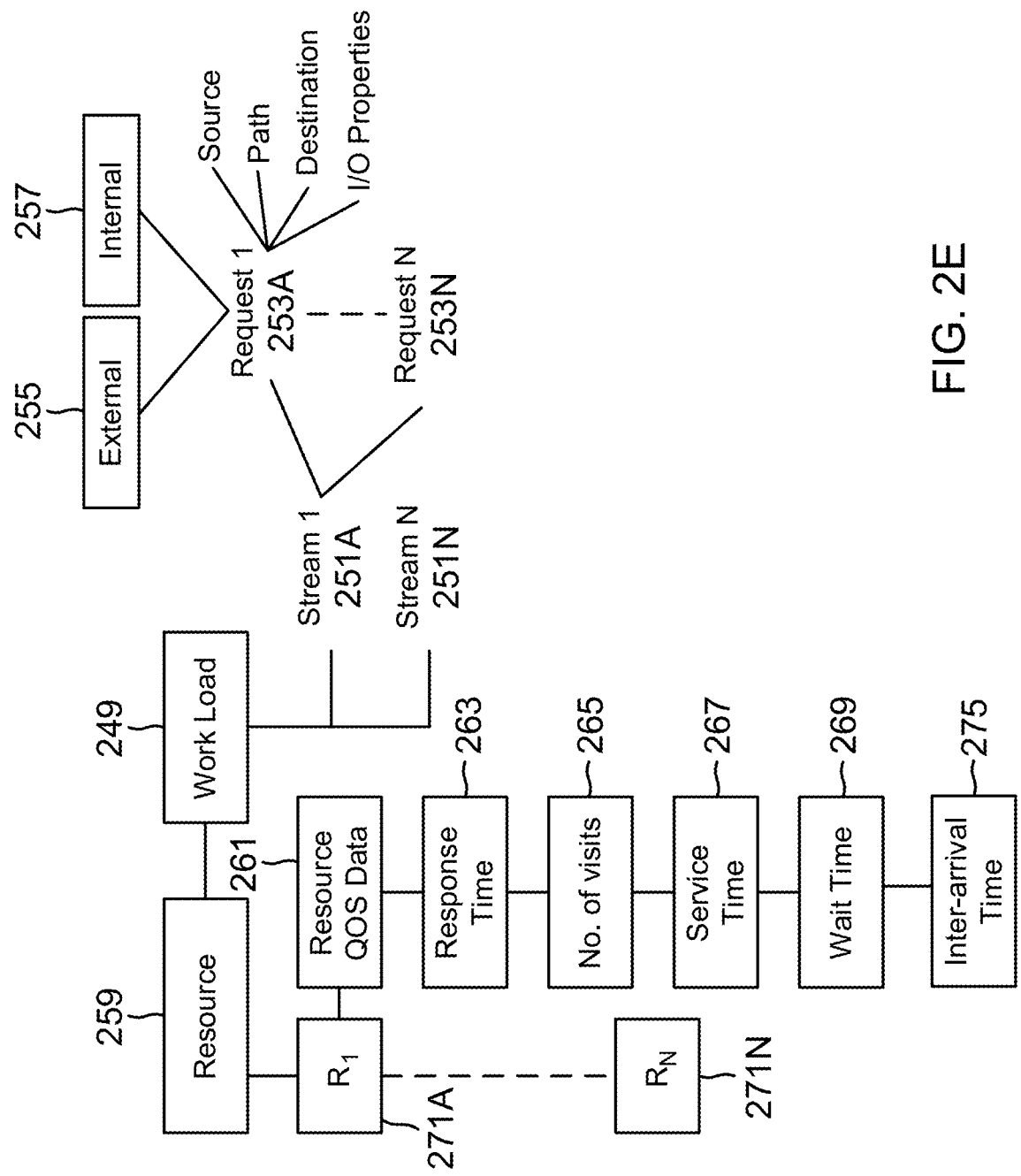
FIG. 2E shows an example of managing workloads and resources by the performance manager, according to one aspect of the present disclosure.

Workload Model:

FIG. 2E shows an example, of the workload model used by performance manager 121, according to one aspect. As an example, a workload may include a plurality of streams 251A-251N. Each stream may have a plurality of requests 253A-253N. The requests may be generated by any entity, for example, an external entity 255, like a client system and/or an internal entity 257, for example, a replication engine that replicates storage volumes at one or more storage location.

A request may have a plurality of attributes, for example, a source, a path, a destination and I/O properties. The source identifies the source from where a request originates, for example, an internal process, a host or client address, a user application and others.

The path defines the entry path into the storage system. For example, a path may be a logical interface (LIF) or a protocol, such as NFS, CIFS, iSCSI and Fibre Channel protocol. A destination is the target of a request, for example, storage volumes, LUNs, data containers and others. I/O properties include operation type (i.e. read/write/other), request size and any other property.

In one aspect, streams may be grouped together based on client needs. For example, if a group of clients make up a department on two different subnets, then two different streams with the "source" restrictions can be defined and grouped within the same workload. Furthermore, requests that fall into a workload are tracked together by performance 121 for efficiency. Any requests that don't match a user or system defined workload may be assigned to a default workload.

In one aspect, workload streams may be defined based on the I/O attributes. The attributes may be defined by clients. Based on the stream definition, performance manager 121 tracks workloads, as described below.

Referring back to FIG. 2E, a workload uses one or more resources for processing I/O requests shown as 271A-271N as part of a resource object 259. The resources include service centers and delay centers that have been described above with respect to FIG. 2D. For each resource, a counter/queue is maintained for tracking different statistics (or QOS data) 261. For example, a response time 263, and a number of visits 265, a service time (for service centers) 267, a wait time 269 and inter-arrival time 275 are tracked. Inter-arrival time 275 is used to track when an I/O request for reading or writing data is received at a resource. The term QOS data as used throughout this specification includes one or more of 263, 265, 267 and 269 according to one aspect.

Performance manager 121 may use a plurality of counter objects for resource monitoring and headroom analysis, according to one aspect. Without limiting the various adaptive aspects, an example of the various counter objects are shown and described in Table I below:

TABLE I

| Workload Object Counters | Description |
| --- | --- |
| OPS | A number of workload operations that are completed during a measurement interval, for example, a second. |
| Read_ops | A number of workload read operations that are completed during the measurement interval. |
| Write_ops | A number of workload write operations that are completed during the measurement interval. |
| Total_data | Total data read and written per second by a workload. |
| Read_data | The data read per second by a workload. |

TABLE I-continued

| Workload Object Counters | Description |
| --- | --- |
| Write_data | The data written per second by a workload. |
| Latency | The average response time for I/O requests that were initiated by a workload. |
| Read_latency | The average response time for read requests that were initiated by a workload. |
| Write_latency | The average response time for write requests that were initiated by a workload. |
| Classified | Requests that were classified as part of a workload. |
| Read_IO_type | The percentage of reads served from various components (for example, buffer cache, ext_cache or disk). |
| Concurrency | Average number of concurrent requests for a workload. |
| Interarrival_time_sum_squares | Sum of the squares of the Inter-arrival time for requests of a workload. |

Without limiting the various aspects of the present disclosure, Table II below provides an example of the details associated with the object counters that are monitored by the performance manager 121, according to one aspect:

TABLE II

| Workload Detail Object Counter | Description |
| --- | --- |
| Visits | A number of visits to a physical resource per second; this value is grouped by a service center. |
| Service_Time | A workload's average service time per visit to the service center. |
| Wait_Time | A workload's average wait time per visit to the service center. |

Figure 3A:
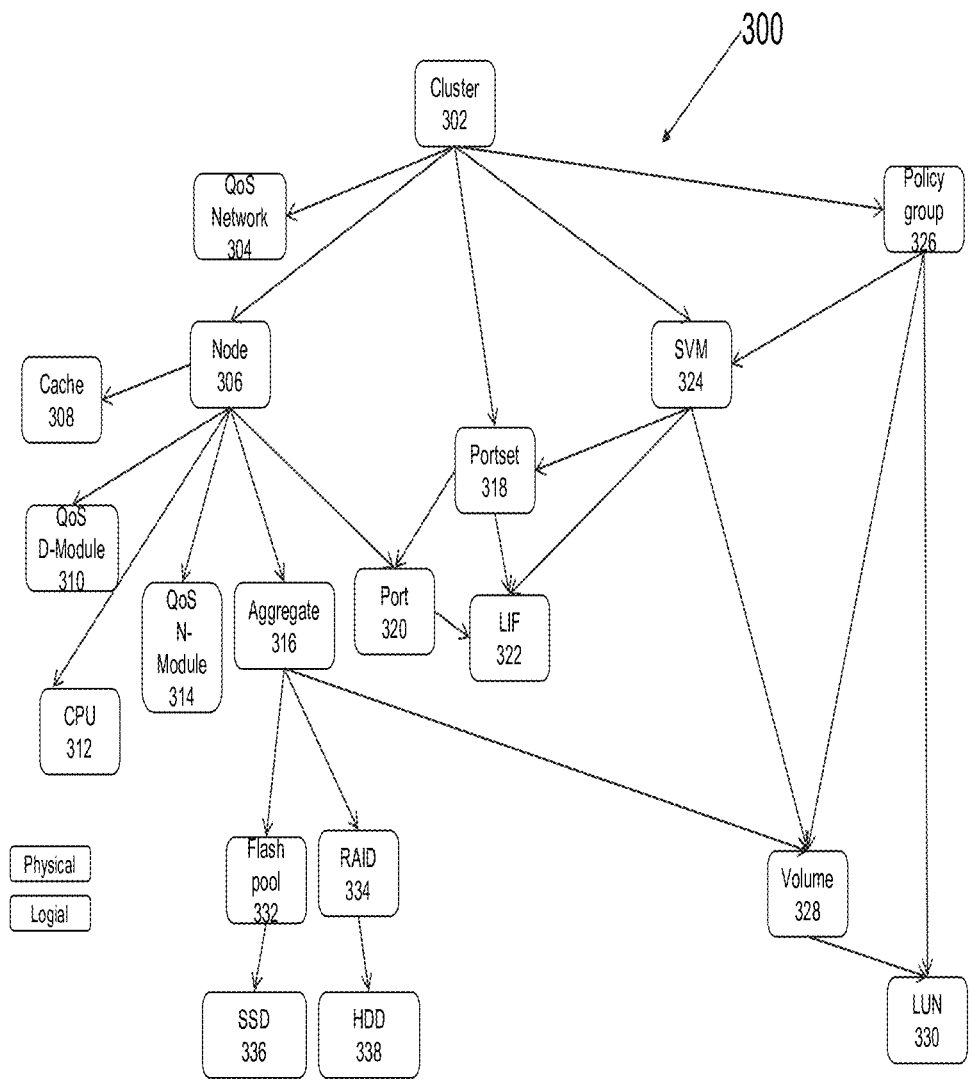
FIG. 3A shows a format for managing various resource objects, according to one aspect of the present disclosure.

Object Hierarchy:

FIG. 3A shows an example of a format 300 for tracking information regarding different resources that are used within a clustered storage system (for example, 202, FIG. 2A). Each resource is identified by a unique resource identifier value that is maintained by the performance manager 121. The resource identifier value may be used to obtain available performance capacity (headroom) of a resource.

Format 300 may be hierarchical in nature where various objects may have parent-child, peer and remote peer relationships, as described below. As an example, format 300 shows a cluster object 302 that may be categorized as a root object type for tracking cluster level resources. The cluster object 302 is associated with various child objects, for example, a node object 306, QOS network object 304, a portset object 318, a SVM object 324 and a policy group 326. The cluster object 302 stores information regarding the cluster, for example, the number of nodes it may have, information identifying the nodes; and any other information.

The QOS network object 304 is used to monitor network resources, for example, network switches and associated bandwidth used by a clustered storage system.

The cluster node object 306 stores information regarding a node, for example, a node identifier and other information. Each cluster node object 306 is associated with a pluralities of child objects, for example, a cache object 308, a QOS object for a storage module 310, a QOS object for a network module 314, a CPU object 312 and an aggregate object 316. The cache object 308 is used to track utilization/latency of a cache (for example, NVRAM 216C, FIG. 2D). The QOS storage module 310 tracks the QOS of a storage module defined by a QOS policy data structure 111 described above in detail with respect to FIG. 2D. The QOS network module object 314 tracks the QOS for a network module. The CPU object 312 is used to track CPU performance and utilization of a node.

The aggregate object 316 tracks the utilization/latency of a storage aggregate that is managed by a cluster node. The aggregate object may have various child objects, for example, a flash pool object 332 that tracks usage of a plurality of flash based storage devices (shown as "flash pool"). The flash pool object 332 may have a SSD disk object 336 that tracks the actual usage of specific SSD based storage devices. The RAID group 334 is used to track the usage of storage devices configured as RAID devices. The RAID object 334 includes a storage device object 338 (shown as a HDD (hard disk drive) that tracks the actual utilization of the storage devices.

Each cluster is provided a portset having a plurality of ports that may be used to access cluster resources. A port includes logic and circuitry for processing information that is used for communication between different resources of the storage system. The portset object 318 tracks the various members of the portset using a port object 320 and a LIF object 322. The LIF object 322 includes a logical interface, for example, an IP address, while the port object 320 includes a port identifier for a port, for example, a worldwide port number (WWPN). It is noteworthy that the port object 320 is also a child object of node 306 that may use a port for network communication with clients.

A cluster may present one or more SVMs to client systems. The SVMs are tracked by the SVM object 324, which is a child object of cluster 302. Each cluster is also associated with a policy group that is tracked by a policy group object 326. The policy group 326 is associated with SVM object 324 as well as storage volumes and LUNs. The storage volume is tracked by a volume object 328 and the LUN is tracked by a LUN object 330. The volume object 328 includes an identifier identifying a volume, size of the volume, clients associated with the volume, volume type (i.e. flexible or fixed size) and other information. The LUN object 330 includes information that identifies the LUN (LUNID), size of the LUN, LUN type (read, write or read and write) and other information.

Figure 3B:
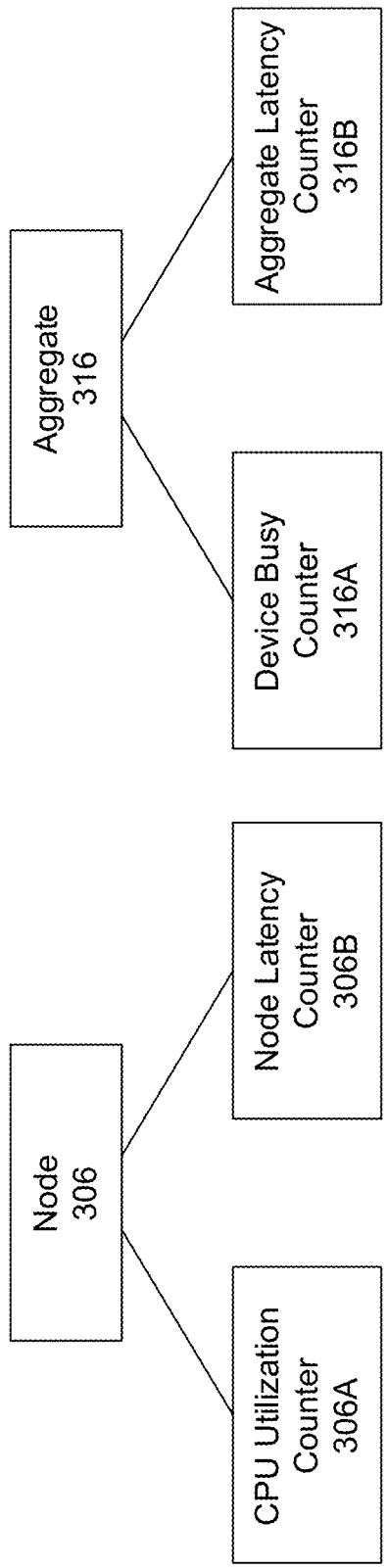
FIG. 3B shows an example of certain counters that are used, according to one aspect of the present disclosure.

FIG. 3B shows an example of some additional counters that are used for headroom analysis, described below in detail. These counters are related to nodes and aggregates and are in addition to the counters of Table I described above. For example, counter 306A is used to track the utilization i.e. idle time for each node processor. Node latency counter 306B tracks the latency at nodes based on operation types. The latency may be based on the total number of visits at a storage system node/number of operations per second for a workload. This value may not include internal or system default workloads, as described below in detail.

Aggregate utilization is tracked using counter 316A that tracks the duration of how busy a device may be for processing user requests. An aggregate latency counter 316B tracks the latency due to the storage devices within an aggregate. The latency may be based on a measured delay for each storage device in an aggregate. The use of these counters for headroom analysis is described below in detail.

Figure 4A:
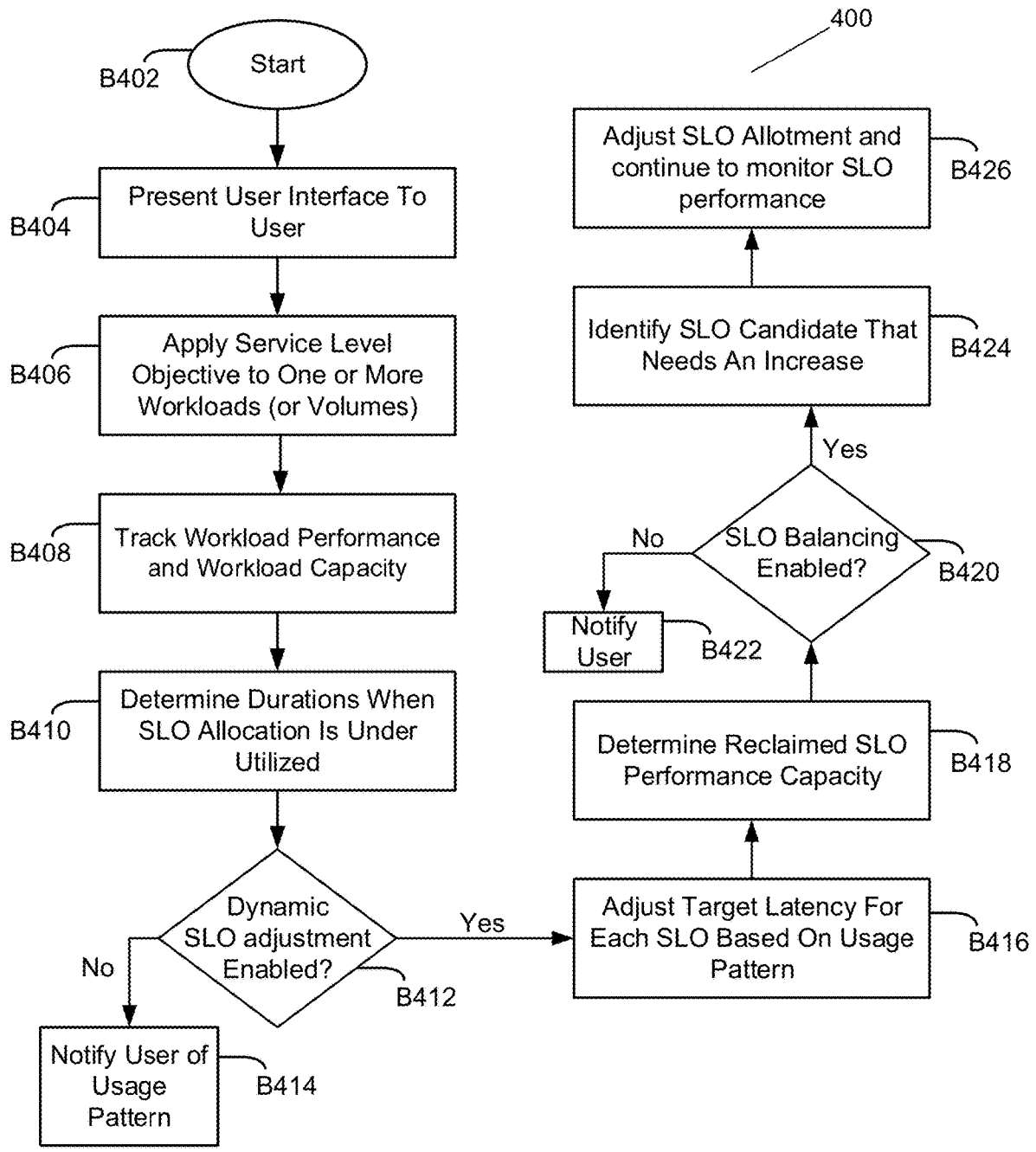
FIG. 4A shows an example of an overall process flow for SLO management, according to one aspect of the present disclosure.

Process Flows:

FIG. 4A shows a process flow 400 for SLO management, according to one aspect of the present disclosure. The process begins in block B402 when the performance manager 121 and the storage cluster nodes are initialized and operational.

In block B404, a user interface is presented to a client system. The user interface may be provided by the GUI module 229.

In block B406, a user applies SLOs to several volumes (or workloads). The SLOs establish a guaranteed service level for the volumes. Once the SLOs are applied, the information regarding the SLO requirements are stored at a policy data structure. The requirements provide metrics for the clustered storage system to process user requests within the parameters of a specific SLO. The SLOs requirements may have default values and/or may be configurable.

Once the SLOs are defined, the user starts using the volumes to store data. In one aspect, in block B408, using QOS data, the SLO monitor 281A tracks volume performance data. The performance capacity of the resources used by the volume are also tracked. The SLO monitor 281A reviews the usage pattern of each SLO to determine when the SLO allocation is being under-utilized.

In block B412, the process determines if dynamic SLO adjustment is enabled based on a load (for example, IOPS) that the workload is sending to the resources. This may be determined by checking volume configuration data. When a volume is configured, an attribute may be defined for dynamic SLO adjustment. If not, then in block B414, the user is notified of the usage pattern for each SLO and the user may make the necessary changes for the SLOs, based on the usage pattern.

If dynamic adjustment is enabled, then in block B416, the SLO monitor 281A adjusts the latency target for each SLO based on the historical pattern. The SLO monitor 281A determines idle periods for each SLO based on certain thresholds. The adjustments to SLO throughput are made by increasing the target latency. Because the latency targets are adjusted, it provides additional performance capacity for the resources. The SLO monitor 281A may interface with the analysis module 223 to ascertain the additional performance capacity.

In block B420, the process determines if dynamic SLO re-balancing is enabled. This may be enabled as part of a policy, a client attribute, a volume attribute or any other factor. If the dynamic SLO balancing is not enabled, then in block B422, the user is notified and the user can reclaim the performance capacity and use the resources for other workloads.

If in block B420, the dynamic balancing is enabled, then in block B424, the SLO monitor 281A identifies a SLO candidate that may need an increase in their allotment i.e. increase in required SLO throughput. This may be based on real time SLO monitoring. The process then automatically adjusts the SLO allotments, The SLOs and the respective workloads are monitored in block B426.

Figure 4B:
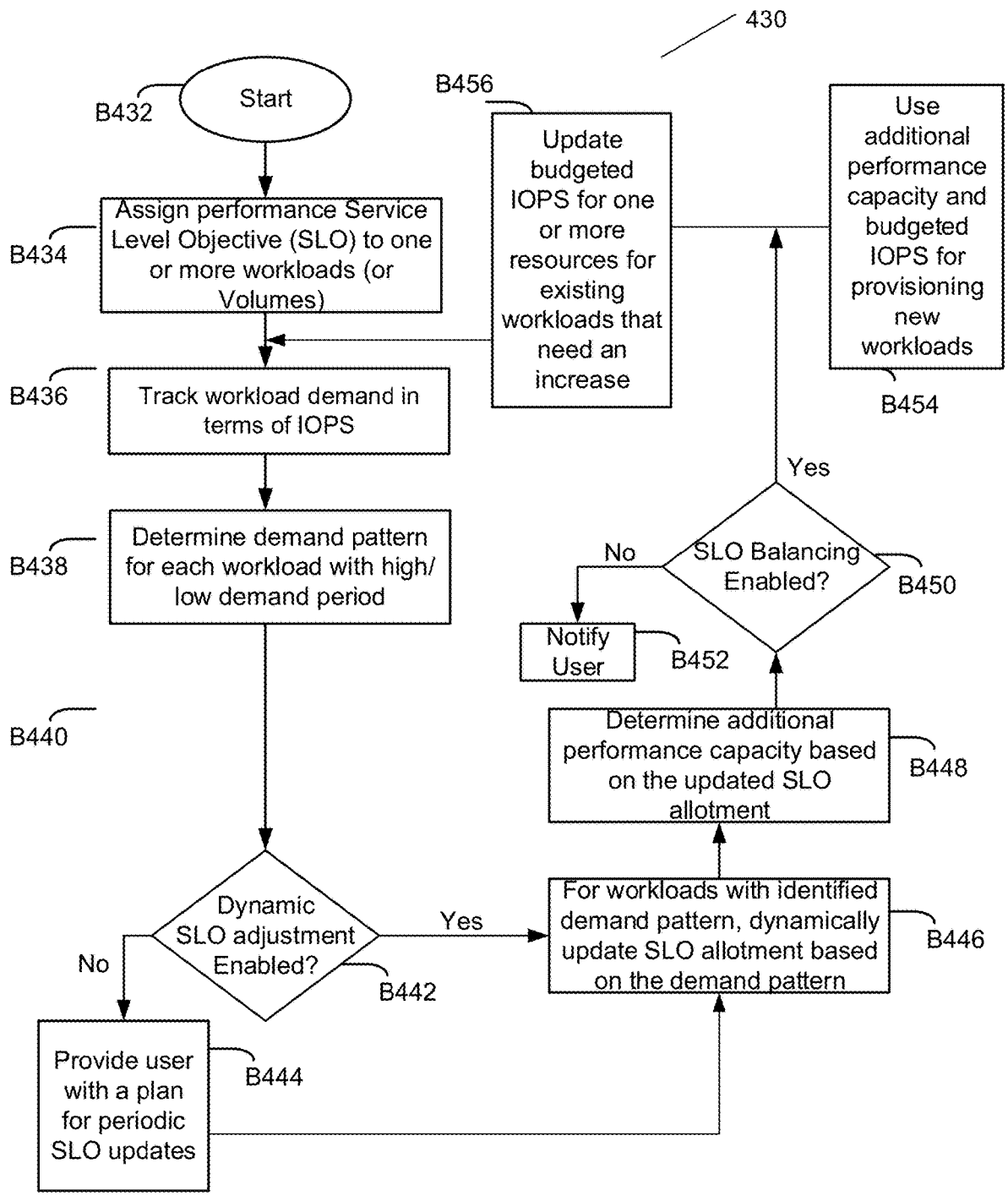
FIG. 4B shows yet another example of an overall process flow for SLO management, according to one aspect of the present disclosure

FIG. 4B shows a process flow 430 for SLO management, according to one aspect of the present disclosure. The process begins in block B432, when the performance manager 121 and the storage cluster nodes are initialized and operational.

In block B434, performance based SLOs are assigned to several volumes (or workloads). The SLOs may be assigned via a user interface, an API or by any other mechanism. The SLOs establish a service level for the volumes and are defined by one or more performance parameters (or metrics), e.g. IOPS, throughput or any other parameter. Based on the SLO, a certain number of IOPS are allotted/budgeted for the workload. Once the SLOs are applied, the information regarding the SLO allotment are stored at a policy data structure. The requirements provide performance parameters for the clustered storage system to process user requests within the performance parameters of a specific SLO. The SLOs requirements may have default values and/or may be configurable.

Once the SLOs are defined by one or more performance parameters, one or more computing systems start using the volumes to store data at the storage systems. In one aspect, in block B438, using QOS data, the SLO monitor 281A tracks volume performance data and workload demand pattern. The performance capacity of the resources used by the volume are also tracked. The SLO monitor 281A reviews the usage pattern/workload demand pattern for workloads to determine when SLO allocation is being under-utilized during a first duration or being utilized during a second duration (See FIG. 6A, described below).

In block B442, the process determines if dynamic SLO adjustment is enabled. This may be determined by checking volume configuration data. When a volume is configured, an attribute may be defined for dynamic SLO adjustment. If not, then in block B444, the user is notified of the usage pattern for the workload and the user is provided with a plan for periodic updates to SLO allotment, based on the usage pattern. When the user agrees to the SLO update plan, the process moves to block B446.

If dynamic adjustment is enabled, then in block B446, the SLO monitor 281A dynamically adjusts the SLO allotment, based on the demand/usage pattern. The SLO monitor 281A determines idle periods for each SLO based on certain thresholds. [FIG. 6A] The allotments to IOPS and/or SLO throughput can be decreased for certain periods (e.g. the first duration), and increased or maintained for certain periods (e.g. the second duration), based on the demand pattern. When the allotted IOPS and/or the SLO throughput are decreased, it frees up available performance capacity of one or more resources that are used by the workload(s). The SLO monitor 281A may interface with the analysis module 223 to ascertain the additional available performance capacity.

In block B450, the process determines if dynamic SLO re-balancing is enabled. This may be enabled as part of a policy, a client attribute, a volume attribute or any other factor. If the dynamic SLO balancing is not enabled, then in block B452, the user is notified and the user can reclaim the additional available performance capacity and use the resources for other workloads.

If in block B450, the dynamic balancing is enabled, then in block B454, the SLO monitor 281A identifies one or more existing workloads that may need a modification in their budgeted/assigned IOPS during the first duration. This may be based on real time SLO monitoring of the workloads. The process then automatically adjusts the budgeted IOPS for one or more resources that are processing the identified one or more workloads. The SLOs and the respective workloads continue to be monitored in block B436.

In parallel to block B456, the available additional performance capacity is used to provision new workloads in real-time. This ensures that performance capacity due to SLO adjustment is being fully utilized for existing and new workloads. It is noteworthy that a portion of the additional performance capacity may be assigned to the identified workloads and to new workloads. In another aspect, if there are no identified existing workloads in block B454, then the entire additional performance capacity may be used for the new workloads.

Figure 5:
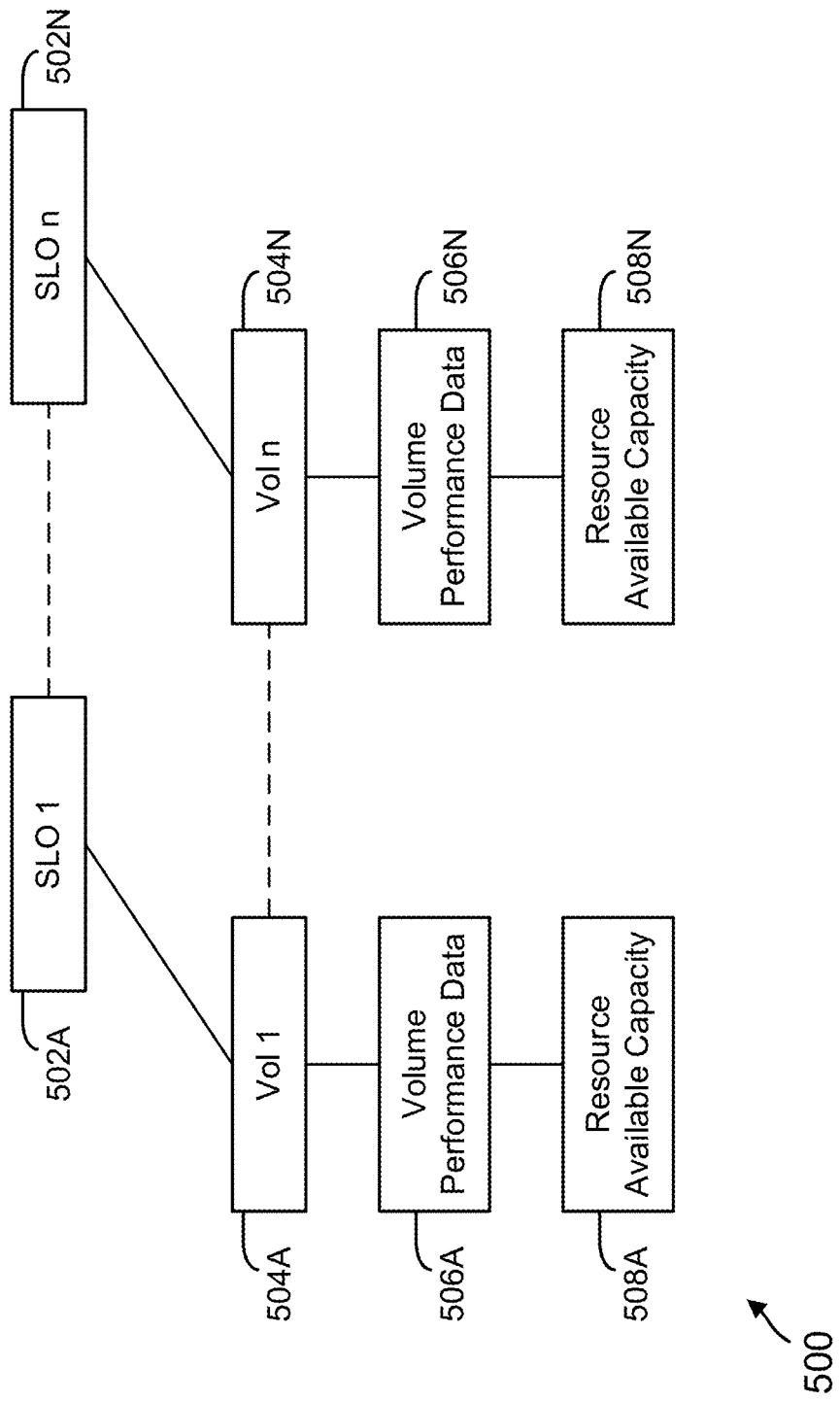
FIG. 5 shows an example of a layout with various components for SLO management, according to one aspect of the present disclosure.

FIG. 5 depicts a layout 500 for executing the process blocks of FIG. 4A/4B. Layout 500 shows a plurality of SLOs 502A-502N that are assigned to a plurality of volumes 504A-504N. The volume performance data and the available resource capacity is maintained in data structures 506A-506N and 508A-508N. These data structures are part of the SLO management data structure 125A described above.

The volume performance data 506A provides an overview of the overall volume i.e. throughput and latency based on collected QOS data. The data structure 508A-508N show the available headroom of the resources used by volumes 504A-504N. Using these data structures enable the SLO management module 281 to execute the process blocks of FIG. 4A/4B, described above in detail.

Figure 6A:
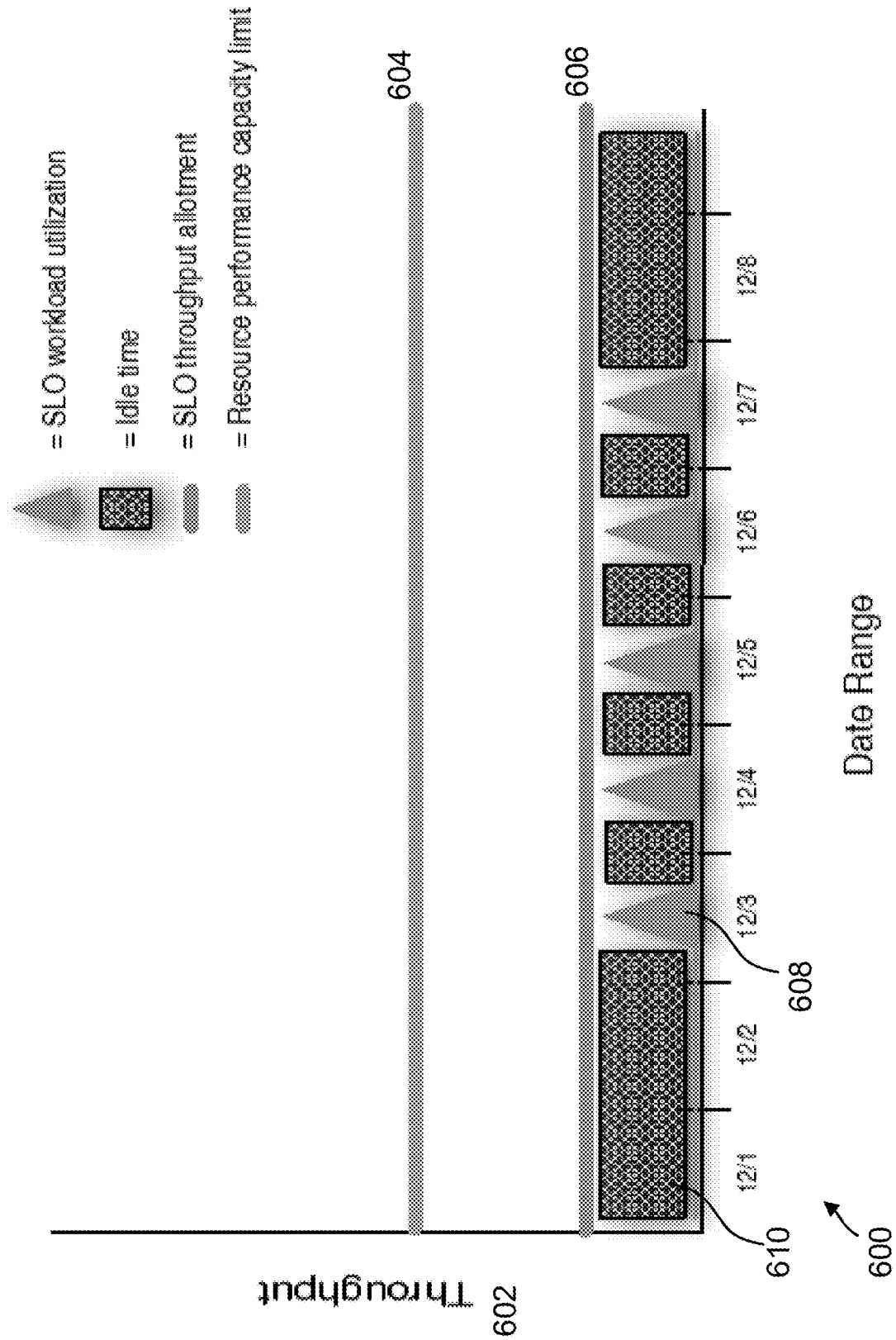
FIG. 6A illustrates a historical view generated by the performance manager for SLO management, according to one aspect of the present disclosure.

FIG. 6A shows a graphical illustration 600 generated by the process blocks of FIG. 4A/4B, according to one aspect of the present disclosure. The SLO throughput allotment is shown as 606. The throughput allotment shows the maximum number of IOPS or throughput for a specific SLO. The resource performance capacity limit for each resource used by a volume is shown as 604. The historical pattern shows idle times (a first duration) as 610 and SLO utilization by the triangles 608. The graphical illustration enables deactivation of the SLO during idle times 610 or create a modified SLO for that duration. This provides additional performance resource capacity that may be used to increase another SLO allotment, as described above.

In one aspect, methods and systems for a networked storage system are provided. One method includes determining by a processor, a demand pattern for a first workload that is assigned a SLO for using a resource of a networked storage system. The SLO is defined by an allotted performance parameter (e.g. IOPS, throughput and other parameters), and the demand pattern identifies a first duration when a SLO allotment for the first workload is underutilized, and a second duration when the SLO allotment is being utilized (FIG. 6A). The SLO allotment is dynamically adjusted by the processor for the first duration by modifying a parameter (e.g. IOPS) associated with the performance parameter, while maintaining the SLO allotment for the second duration. This makes additional performance capacity (or headroom) of the resource available for re-allocation during the first duration. The additional available performance capacity is dynamically allocated for an identified second workload that needs an increase in SLO allotment during the first duration and/or for provisioning a new workload. It is noteworthy that the additional available performance capacity may be allocated to more than one workload.

Figure 6B:
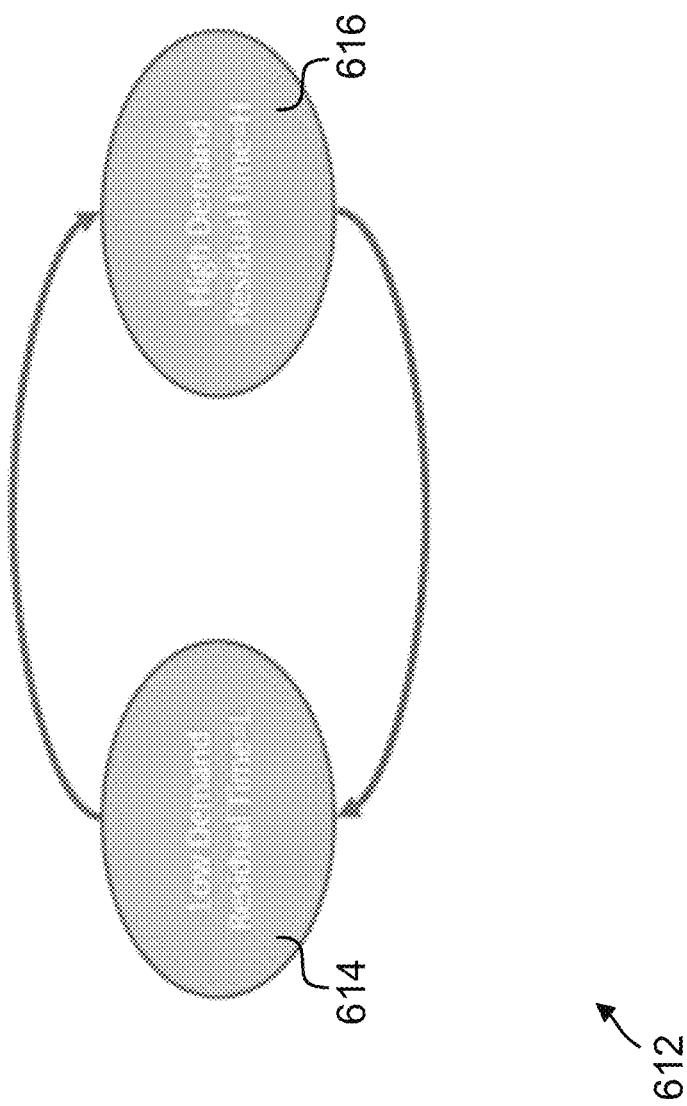
FIG. 6B illustrates a state based model for determining idle and non-idle time for SLO management, according to one aspect of the present disclosure.

FIG. 6B shows an example of a state-based model 612 executed by the SLO management module 281. In the model 612, the length of time in low demand 614 and high demand 616 provides the periodicity of "idleness" in a resource or workload. This periodicity and the respective time in each state is used by the SLO scheduler 281B to determine automatic SLO adjustment allotment. In one aspect, the automatic adjustment schedules are very efficient for example, in a cloud environment where thousands of SLOs and volumes are used by numerous clients.

Headroom Computation and Analysis:

The performance capacity of a resource is determined by the headroom module 221, a processor executable module. The headroom module 221 uses performance data (for example, latency and utilization data, inter-arrival times and/or service times) for at least the cluster nodes and aggregates has been collected. The collected data is provided to the performance manager 121. In one aspect, current and historical QOS data may both be accessed by the performance manager 121 for determining headroom. The performance manager 121 also obtains information regarding any events that may have occurred at the storage system level associated with the QOS data. Any policy information that is associated with the resource for which the QOS data is also obtained by the performance manager 121.

The filtering module 237 filters the collected data. In one aspect, potential erroneous observations such as unreasonable large latency values, variances, service times or utilizations are identified. If there is any data associated with unusual events like hardware failure or network failure that may affect performance may be discarded. For example, if a flash memory card used by a node fails and has to be replaced, then the latency for processing I/O requests with the failed card may be unreasonably high and hence data associated with that node may not be reliable for headroom computations. Any outliers in the collected and historical QOS data may also be removed (for example, the top 5-10% and the bottom 5-10% of the latency and utilization values may be discarded).

In one aspect, filtering module 237 may also insert missing data, according to one aspect. For example, service times for different resources are expected to be within a range based on collected historical service time data. If the collected data have a high coefficient of variation, then the collected data may not be reliable and hence may have to be corrected.

After the data is filtered, one or more LvU curves are generated and an optimal point is determined by the optimal point module 225. In one aspect, as an example, different techniques (for example, model based and observation based techniques) are used to generate the LvU curves and compute the optimal point. The technique that provides the most reliable optimal point is used for headroom analysis.

The model based technique uses current observations and queuing models to generate the LvU curve. The model based technique uses inter-arrival times and service times for a resource. The inter-arrival times track the arrival times for I/O requests at a resource, while the service times track the duration for servicing user based I/O requests. The observation based technique uses both current and historical observations of latency and utilizations for generating LvU curves. It is noteworthy that the various adaptive aspects of the present disclosure are not limited to any specific technique.

The optimal point is selected and provided to the analysis module 223. The optimal point may be based on a policy based input, for example, a SLO input (for example, from a policy). The SLO input defines a latency limit that is assigned for a user/resource. The analysis module 223 determines the headroom (using the optimal point and an operational point. In one aspect, different operational points may be used for a resource based on the operating environment and how the resources are being used. For example, a current total utilization may be used as an operational point with the presumption that the current total utilization may be used to process a workload mix.

In another aspect, a custom operational point may be used when a volume is identified in a policy. In another aspect, the analysis module 223 may ascertain the effect of moving workloads which may affect utilization and the operational point. In yet another aspect, the utilization of a node pair that are configured as high availability (HA) pair nodes is considered for the operational point. When nodes operate as HA pair nodes and if one of the nodes becomes unavailable, then the other node takes over workload processing. In this instance, latency/utilization of both the nodes is used for determining the operational point and computing the headroom. This headroom analysis is referred to as the actual headroom. Headroom information may be stored at data structure 125A.

Figure 6C:
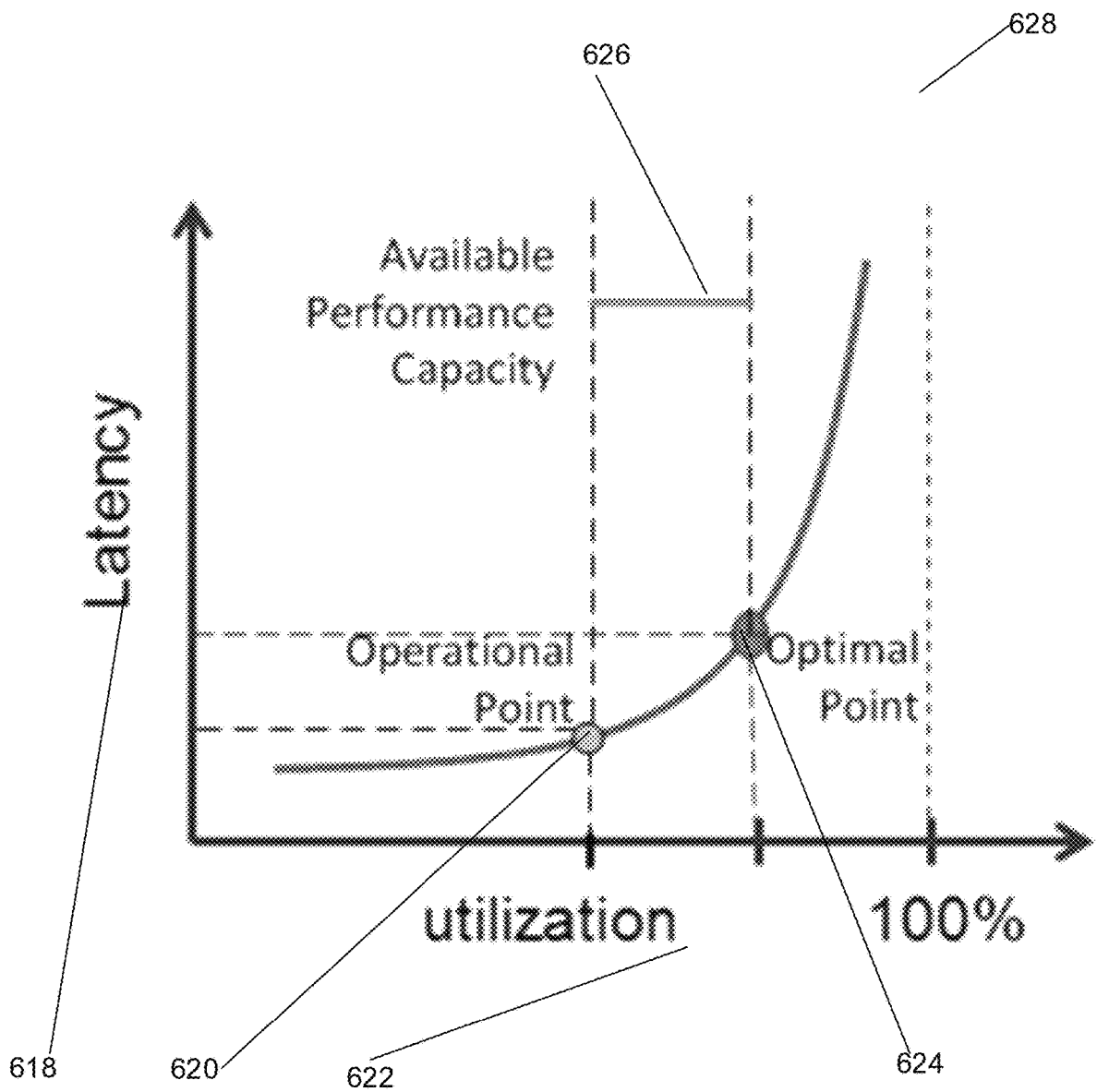
FIG. 6C shows an example of a latency v. utilization curve (LvU), for determining headroom (performance capacity), according to one aspect of the present disclosure.

Latency v Utilization Curve:

In one aspect, the remaining or available performance capacity is determined from a LvU curve. FIG. 6C shows an example of a relationship 628 between latency and utilization of a resource to determine headroom or performance capacity of a resource at any given time. Latency 618 for a given resource that is used to process workloads is shown on the vertical, Y-axis, while the utilization 622 of the resource is shown on the X-axis.

The latency v utilization curve shows an optimal point 624, after which latency shows a rapid increase. Optimal point represents maximum utilization of a resource beyond which an increase in workload are associated with higher throughput gains than latency increase. Beyond the optimal point, if the workload increases at a resource, the throughput gains or utilization increase is smaller than the increase in latency. An optimal point may be determined by a plurality of techniques defined below. The optimal point may also be customized based on a SLO that guarantees certain latency/utilization for a user.

An operational point 620 shows current utilization of the resource. The available performance capacity is shown as 626. In one aspect, the operational point 620 may be determined based on current utilization of a resource. The operational point may also be determined based on the effect of internal workloads (for example, when a storage volume is moved), when a storage node is configured as a high availability failover nodes or when there are workloads that can be throttled or delayed because they may not be very critical.

In one aspect, headroom (or performance capacity) may be based on the following relationship:

Headroom=Optimal Point−Operation Point/Optimal Point

Details of generating a LvU curve are provided in the U.S. patent application Ser. No. 14/994,009 filed on Jan. 12, 2016, the disclosure of which is incorporated herein by reference in its entirety.

Figure 7:
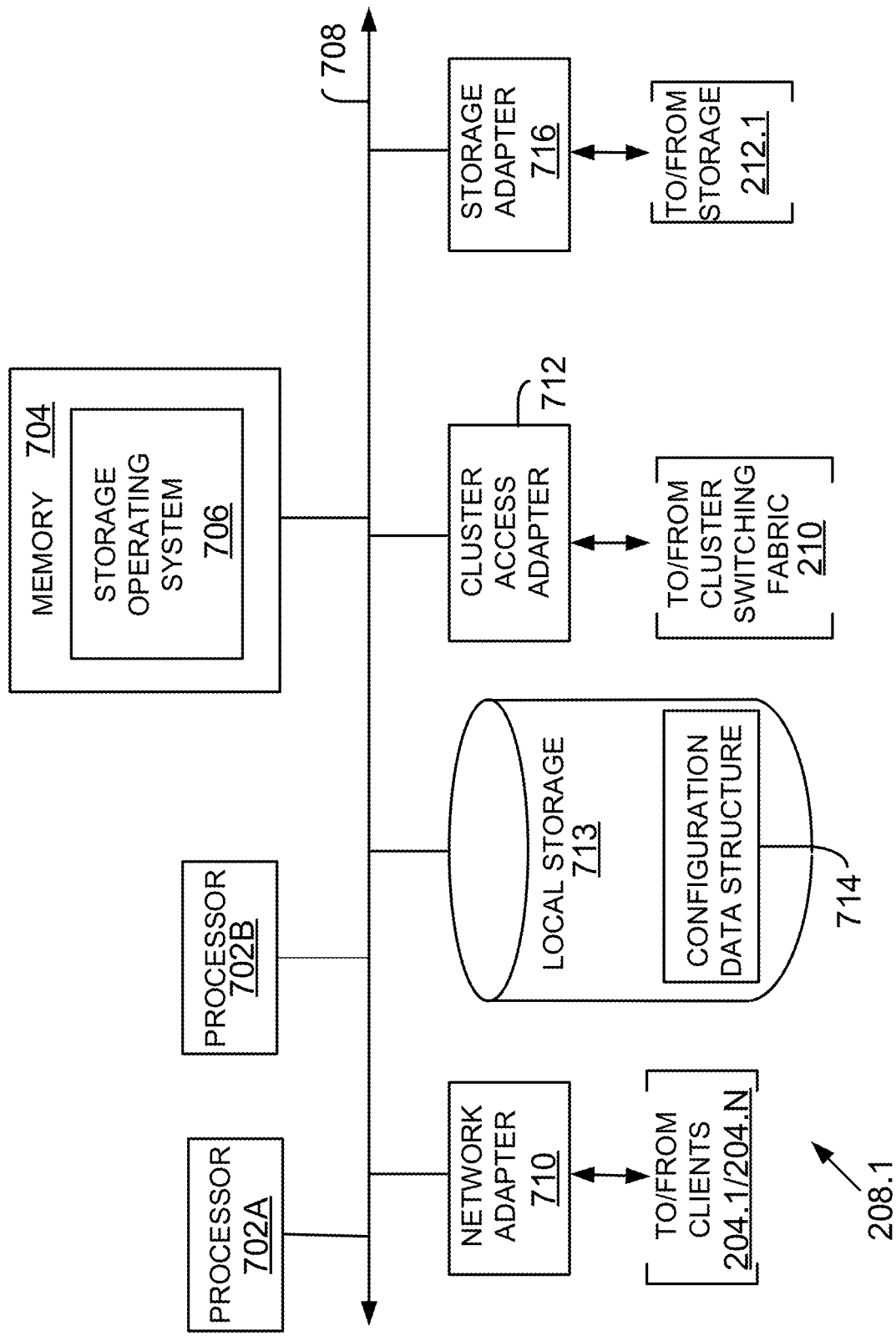
FIG. 7 shows an example of a storage system, used according to one aspect of the present disclosure.

Storage System Node:

FIG. 7 is a block diagram of a node 208.1 that is illustratively embodied as a storage system comprising of a plurality of processors 702A and 702B, a memory 704, a network adapter 710, a cluster access adapter 712, a storage adapter 716 and local storage 713 interconnected by a system bus 708. Node 208.1 is used as a resource and may be used to provide node and storage utilization information to performance manager 121 described above in detail.

Processors 702A-702B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. Idle time for processors 702A-702A is tracked by counters 306A, described above in detail.

The local storage 713 comprises one or more storage devices utilized by the node to locally store configuration information for example, in a configuration data structure 714. The configuration information may include information regarding storage volumes and the QOS/SLO associated with each storage volume.

The cluster access adapter 712 comprises a plurality of ports adapted to couple node 208.1 to other nodes of cluster 202. In the illustrative aspect, Ethernet may be used as the clustering protocol and interconnect media, although it will be apparent to those skilled in the art that other types of protocols and interconnects may be utilized within the cluster architecture described herein. In alternate aspects where the network modules and storage modules are implemented on separate storage systems or computers, the cluster access adapter 712 is utilized by the network/storage module for communicating with other network/storage-modules in the cluster 202.

Each node 208.1 is illustratively embodied as a dual processor storage system executing a storage operating system 706 (similar to 107, FIG. 1) that preferably implements a high-level module, such as a file system, to logically organize the information as a hierarchical structure of named directories and files at storage 212.1. However, it will be apparent to those of ordinary skill in the art that the node 208.1 may alternatively comprise a single or more than two processor systems. Illustratively, one processor 702A executes the functions of the network module on the node, while the other processor 702B executes the functions of the storage module.

The memory 704 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the disclosure described herein.

The storage operating system 706 portions of which is typically resident in memory and executed by the processing elements, functionally organizes the node 208.1 by, inter alia, invoking storage operation in support of the storage service implemented by the node.

The network adapter 710 comprises a plurality of ports adapted to couple the node 208.1 to one or more clients 204.1/204.N over point-to-point links, wide area networks, virtual private networks implemented over a public network (Internet) or a shared local area network. The network adapter 710 thus may comprise the mechanical, electrical and signaling circuitry needed to connect the node to the network. Each client 204.1/204.N may communicate with the node over network 206 (FIG. 2A) by exchanging discrete frames or packets of data according to pre-defined protocols, such as TCP/IP.

The storage adapter 716 cooperates with the storage operating system 706 executing on the node 208.1 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored at storage device 212.1. The storage adapter 716 comprises a plurality of ports having input/output (I/O) interface circuitry that couples to the storage devices over an I/O interconnect arrangement, such as a conventional high-performance, Fibre Channel link topology.

Figure 8:
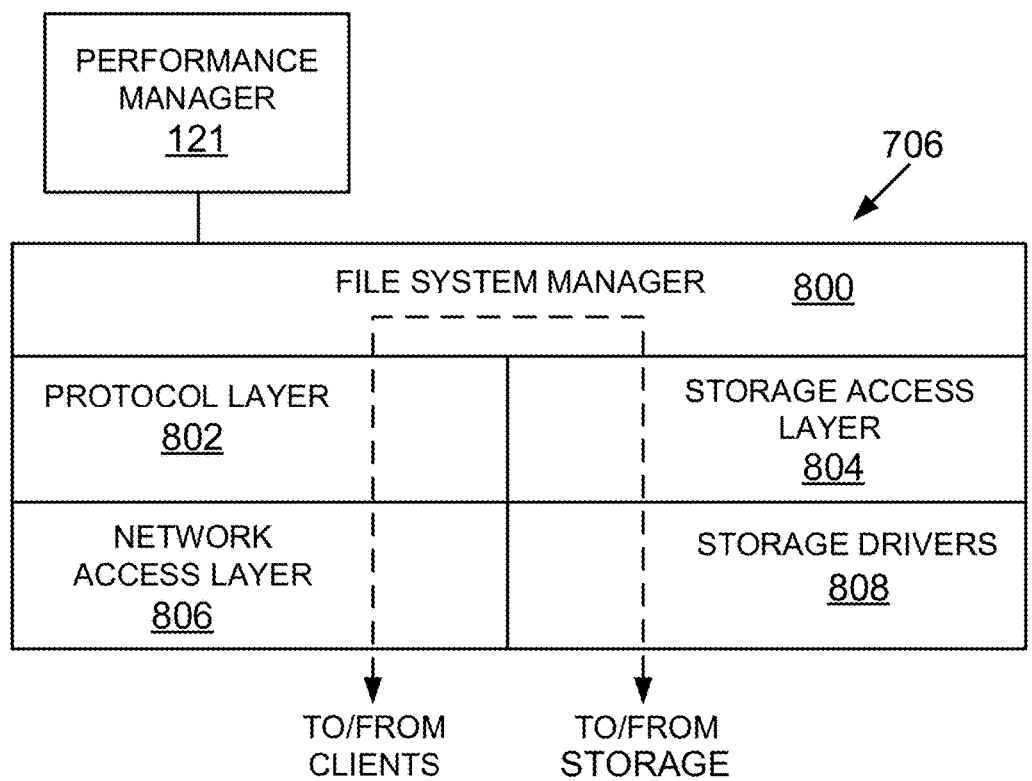
FIG. 8 shows an example of a storage operating system, used according to one aspect of the present disclosure.

Operating System:

FIG. 8 illustrates a generic example of storage operating system 706 (or 107, FIG. 1) executed by node 208.1, according to one aspect of the present disclosure. The storage operating system 706 interfaces with the QOS module 109 and the performance manager 121 such that proper bandwidth and QOS policies are implemented at the storage volume level. The storage operating system 706 may also maintain a plurality of counters for tracking node utilization and storage device utilization information. For example, counters 306A-306B and 316A-316C may also be maintained by the storage operating system 706 and counter information is provided to the performance manager 121. In another aspect, performance manager 121 maintains the counters and they are updated based on information provided by the storage operating system 706.

In one example, storage operating system 706 may include several modules, or "layers" executed by one or both of network module 214 and storage module 216. These layers include a file system manager 800 that keeps track of a directory structure (hierarchy) of the data stored in storage devices and manages read/write operation, i.e. executes read/write operation on storage in response to client 204.1/204.N requests.

Storage operating system 706 may also include a protocol layer 802 and an associated network access layer 806, to allow node 208.1 to communicate over a network with other systems, such as clients 204.1/204.N. Protocol layer 802 may implement one or more of various higher-level network protocols, such as NFS, CIFS, Hypertext Transfer Protocol (HTTP), TCP/IP and others.

Network access layer 806 may include one or more drivers, which implement one or more lower-level protocols to communicate over the network, such as Ethernet. Interactions between clients' and mass storage devices 212.1-212.3 (or 114) are illustrated schematically as a path, which illustrates the flow of data through storage operating system 706.

The storage operating system 706 may also include a storage access layer 804 and an associated storage driver layer 808 to allow storage module 216 to communicate with a storage device. The storage access layer 804 may implement a higher-level storage protocol, such as RAID (redundant array of inexpensive disks), while the storage driver layer 808 may implement a lower-level storage device access protocol, such as Fibre Channel or SCSI. The storage driver layer 808 may maintain various data structures (not shown) for storing information regarding storage volume, aggregate and various storage devices.

As used herein, the term "storage operating system" generally refers to the computer-executable code operable on a computer to perform a storage function that manages data access and may, in the case of a node 208.1, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

Figure 9:
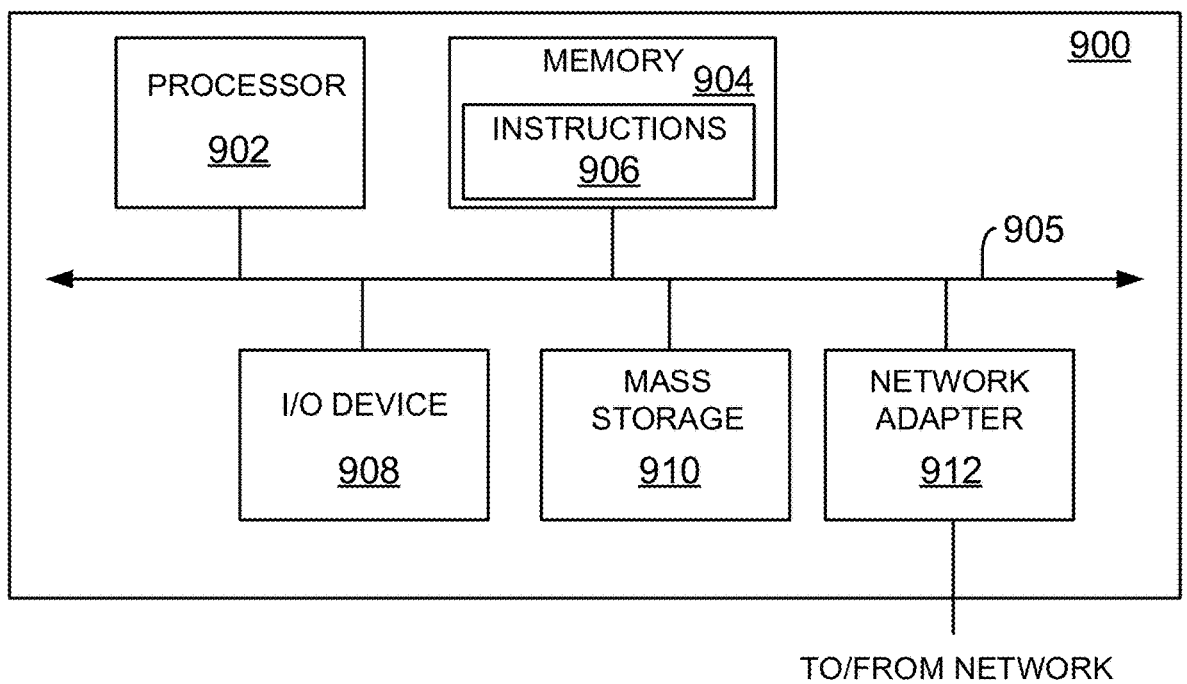
FIG. 9 shows an example of a processing system, used according to one aspect of the present disclosure.

Processing System:

FIG. 9 is a high-level block diagram showing an example of the architecture of a processing system 900 that may be used according to one aspect. The processing system 900 can represent performance manager 121, host system 102, management console 118, clients 116, 204, or storage system 108. Note that certain standard and well-known components which are not germane to the present aspects are not shown in FIG. 9.

The processing system 900 includes one or more processor(s) 902 and memory 904, coupled to a bus system 905. The bus system 905 shown in FIG. 9 is an abstraction that represents any one or more separate physical buses and/or point-to-point connections, connected by appropriate bridges, adapters and/or controllers. The bus system 905, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 902 are the central processing units (CPUs) of the processing system 900 and, thus, control its overall operation. In certain aspects, the processors 902 accomplish this by executing software stored in memory 904. A processor 902 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 904 represents any form of random access memory (RAM), read-only memory (ROM), flash memory, or the like, or a combination of such devices. Memory 904 includes the main memory of the processing system 900. Instructions 906 implement the process steps of FIG. 4A/4B and store data structure 125A described above may reside in and executed by processors 902 from memory 904.

Also connected to the processors 902 through the bus system 905 are one or more internal mass storage devices 910, and a network adapter 912. Internal mass storage devices 910 may be, or may include any conventional medium for storing large volumes of data in a non-volatile manner, such as one or more magnetic or optical based disks. The network adapter 912 provides the processing system 900 with the ability to communicate with remote devices (e.g., storage servers) over a network and may be, for example, an Ethernet adapter, a Fibre Channel adapter, or the like.

The processing system 900 also includes one or more input/output (I/O) devices 908 coupled to the bus system 905. The I/O devices 908 may include, for example, a display device, a keyboard, a mouse, etc.

Cloud Computing:

The system and techniques described above are applicable and especially useful in the cloud computing environment where storage is presented and shared across different platforms. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to a network, for example, the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. The storage systems/performance manager described above can be a part of the server layer for providing storage services. Details regarding these layers are not germane to the inventive aspects.

Thus, methods and apparatus for managing resources in a storage environment have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method, comprising:

setting, by a processor, an attribute for a first workload for enabling dynamic service level objective (SLO) adjustment in a networked storage system;

determining by the processor, a demand pattern for the first workload that is assigned a SLO for using a resource of the networked storage system, the SLO defined by an allotted performance parameter for storing and retrieving data from the network storage system;

utilizing, by the processor, the demand pattern to identify a first duration when SLO allotment for the first workload is underutilized, and a second duration when the SLO allotment is being utilized;

based on the set attribute, dynamically adjusting the SLO allotment by the processor for the first duration by modifying a parameter associated with the allotted performance parameter, while maintaining the SLO allotment for the second duration;

upon modifying the parameter, determining by the processor, additional performance capacity of the resource available for re-allocation; the additional available performance capacity of the resource is based on a relationship between latency and utilization of the resource, the relationship selected from latency and utilization relationships generated by a model based technique and an observation based technique; and dynamically allocating the additional available performance capacity by the processor for an identified second workload that needs an increase in SLO allotment for a certain duration.

2. The method of claim 1, further comprising: dynamically allocating the additional performance capacity of the resource by the processor for provisioning a new workload in the networked storage system.

3. The method of claim 1, further comprising: utilizing a number of input/output operations per second (IOPS) as the modified parameter, the number of IOPS budgeted for the resource for storing and retrieving data.

4. The method of claim 1, further comprising: utilizing a target latency for the first workload as the modified parameter, the target latency associated with a throughput, where the throughput is the allotted performance parameter.

5. The method of claim 1, further comprising: for the model based technique, using by the processor, a queuing model with inter-arrival time and service time for processing workload requests to generate a relationship between latency and utilization.

6. The method of claim 1, further comprising: for the observation based technique, using by the processor measured latency and utilization of the resource to generate a relationship between latency and utilization.

7. The method of claim 1, wherein the allotted performance parameter is a number of input/output operations per second (IOPS) allotted to the first workload for storing and retrieving data.

8. A non-transitory machine readable storage medium having stored thereon instructions for performing a method, comprising machine executable code which when executed by at least one machine, causes the machine to:

determine a demand pattern for a first workload that is assigned a service level objective (SLO) for using a resource of a networked storage system, the SLO defined by an allotted performance parameter for storing and retrieving data from the network storage system;

utilize the demand pattern to identify a first duration when SLO allotment for the first workload is underutilized and a second duration when the SLO allotment is being utilized;

based on a set attribute of the first workload, dynamically adjust the SLO allotment for the first duration, by modifying a parameter associated with the allotted performance parameter, while maintaining the SLO allotment for the second duration;

upon modifying the parameter, determine additional performance capacity of the resource available for re-allocation; the additional available performance capacity of the resource is based on a relationship between latency and utilization of the resource, the relationship selected from latency and utilization relationships generated by a model based technique and an observation based technique; and dynamically allocate the additional available performance capacity for an identified second workload that needs an increase in SLO allotment for a certain duration.

9. The storage medium of claim 8, wherein the machine executable code further causes the machine to: dynamically allocate the additional performance capacity of the resource for provisioning a new workload in the networked storage system.

10. The storage medium of claim 8, wherein the machine executable code further causes the machine to: utilize a number of input/output operations per second (IOPS) as the modified parameter, the number of IOPS budgeted for the resource for storing and retrieving data.

11. The storage medium of claim 8, wherein the machine executable code further causes the machine to: utilize a target latency for the first workload as the modified parameter, the target latency associated with a throughput, where the throughput is the allotted performance parameter.

12. The storage medium of claim 8, wherein the machine executable code further causes the machine to: use a queuing model with inter-arrival time and service time for processing workload requests to generate a relationship between latency and utilization for the model based technique.

13. The storage medium of claim 8, wherein the machine executable code further causes the machine to: use measured latency and utilization of the resource to generate a relationship between latency and utilization for the observation based technique.

14. The storage medium of claim 8, wherein the allotted performance parameter is a number of input/output operations per second (IOPS) allotted to the first workload for storing and retrieving data.

15. A system comprising:
a memory containing machine readable medium comprising machine executable code having stored thereon instructions; and a processor coupled to the memory, the processor configured to execute the machine executable code to:

determine a demand pattern for a first workload that is assigned a service level objective (SLO) for using a resource of a networked storage system, the SLO defined by an allotted performance parameter for storing and retrieving data from the network storage system;

utilize the demand pattern to identify a first duration when SLO allotment for the first workload is underutilized, and a second duration when the SLO allotment is being utilized;

based on a set attribute for the first workload, dynamically adjust the SLO allotment for the first duration by modifying a parameter associated with the allotted performance parameter, while maintaining the SLO allotment for the second duration;

upon modifying the parameter, determine additional performance capacity of the resource available for re-allocation; the additional available performance capacity of the resource is based on a relationship between latency and utilization of the resource, the relationship selected from latency and utilization relationships generated by a model based technique and an observation based technique; and dynamically allocate the additional available performance capacity for an identified second workload that needs an increase in SLO allotment for a certain duration.

16. The system of claim 8, wherein the processor further executes the machine executable code to: dynamically allocate the additional performance capacity of the resource for provisioning a new workload in the networked storage system.

17. The system of claim 15, wherein the processor further executes the machine executable code to: utilize a number of input/output operations per second (IOPS) as the modified parameter, the number of IOPS budgeted for the resource for storing and retrieving data.

18. The system of claim 15, wherein the processor further executes the machine executable code to: use a queuing model with inter-arrival time and service time for processing workload requests to generate a relationship between latency and utilization for the model based technique.

19. The system of claim 15, wherein the processor further executes the machine executable code to: use measured latency and utilization of the resource to generate a relationship between latency and utilization for the observation based technique.

20. The system of claim 15, wherein the allotted performance parameter is a number of input/output operations per second (IOPS) allotted to the first workload for storing and retrieving data.

* * * * *